United States Patent [19]

Colemere, Jr.

[11] Patent Number: 5,835,008
[45] Date of Patent: Nov. 10, 1998

[54] DRIVER, VEHICLE AND TRAFFIC INFORMATION SYSTEM

[76] Inventor: Dale M. Colemere, Jr., P.O. Box 16177, Panama City, Fla. 32406

[21] Appl. No.: 758,049

[22] Filed: Nov. 27, 1996

Related U.S. Application Data

[60] Provisional application No. 60/007,650 Nov. 28, 1995.
[51] Int. Cl. [6] ........................................... B60Q 1/00
[52] U.S. Cl. .............................. 340/439; 340/576; 701/70
[58] Field of Search ..................................... 340/439, 438, 340/575, 576, 479; 364/423.098, 424.04; 701/1, 70

[56] References Cited

U.S. PATENT DOCUMENTS

| | | | |
|---|---|---|---|
| 3,171,917 | 3/1965 | Leichsenring | 340/467 |
| 4,170,723 | 10/1979 | Arsoy | 340/467 |
| 4,901,055 | 2/1990 | Rosenberg et al. | 340/467 |
| 5,387,898 | 2/1995 | Yeheskel et al. | 340/467 |
| 5,465,079 | 11/1995 | Bouchard et al. | 340/439 |
| 5,521,580 | 5/1996 | Kaneko et al. | 340/439 |
| 5,532,671 | 7/1996 | Bachman et al. | 340/438 |

*Primary Examiner*—Brent A. Swarthout

[57] ABSTRACT

An information system that monitors the position and motions of a driver's feet to provide information that can be put into usable form for drivers, vehicle systems, and traffic management authorities. Sensors monitor the position of a driver's foot, especially as the driver responds to situations that normally require quick responses. As a series of positions are recorded, the processor calculates the direction, speed, and acceleration of the foot as it travels in the area surrounding the accelerator and brake pedal. The information system then compares calculated values to see if they are lower, equal, or higher than set values. Low values can be assumed to be those obtained when there are no situations requiring quick response and when the foot is moving at a slower pace. Higher values represent times when the driver's foot reacted quicker to actual or perceived concerns in the driving environment. The higher values are then processed to see if the driver or other drivers may be at an elevated risk. If there is an elevated risk, signals to the driver and possibly to the vehicle operating systems are provided. As appropriate, signals will be provided to other drivers and their vehicles, as well as to traffic authorities who may be monitoring signals as provided by wireless communication. The system also monitors the measurements of the driver's foot position and motions to indicate activity leading up to potential driver and vehicle changes in maneuvering, particularly at times when the driver may be hesitant at carrying out the maneuver. Counts are maintained in registers to check the level of activity of various foot operating maneuvers. Higher counts can represent increased activity which may represent the increased potential for changes in a driver's maneuvering. Higher counts can also be representative of a driver's anxiety or being unsure, or of hectic traffic. The information system is intended to provide information to the driver, the vehicle, and traffic management authorities so that a safer driving environment can be attained.

29 Claims, 15 Drawing Sheets

DRIVER, VEHICLE AND TRAFFIC INFORMATION SYSTEM

This application claims the benefit of U.S. Provisional application Ser. No. 60/007,650 filed Nov. 28, 1995.

BACKGROUND OF THE INVENTION—FIELD OF THE INVENTION

The present invention relates to a safety information system for motor vehicles that can monitor activities of a driver and then use the information to analyze and help predict potential intent (such as braking) of the driver and to provide real-time driver reaction to the traffic and the environment. The data could be used immediately or be used later to analyze general road conditions, driver stress, and other factors which would be important to drivers, other vehicle occupants, and emergency, traffic planning, and road management agencies, as well as others.

BACKGROUND—DESCRIPTION OF PRIOR ART

There are a number of systems currently being used or being proposed to be put into use in motor vehicles of the future to enhance safety, traffic flow, and driver feelings of security. However, there are still many issues in safety, driving enhancement, vehicle protection, traffic management, stress relief, and other fields that need to be addressed. The following needs show that there is a an absence of the present invention in motor vehicles.

There is a need:

To provide information on the possible intents of other drivers, such as potential braking or lane changes, to drivers and vehicle systems before the need to use systems that may choose maneuvers that may not be preferred in particular situations such as automatic steering, automatic braking, and automatic acceleration, and before the need to rely on equipment such as airbags, collapsible steering columns, and vehicle crush zones whose use assumes the driver and vehicle are already being exposed to impact conditions.

To more adequately identify many of the driving situations that drivers endure but which current systems do not address.

To track the many accidents that almost happen.

To detect objects in a road with broader limits on the size and the material and type of objects detected, and which can operate in winding tunnels and under low bridges.

To provide the driver with relevant information on the environment that may not be part of the immediate roadway, yet which can influence driving.

To provide more driver-sensitive information input into navigational systems.

To provide a more stress-free driving environment.

To provide traffic and road managers more information on how drivers respond to realtime traffic and roads.

To provide a forward-looking driver information system that is less vulnerable to environmental degradation such as contaminants and weather conditions.

To provide improved object and other-vehicle detection in heavy traffic and where there are potential interfering objects and vehicles around them.

To provide information that can be used in varied media, including simulators, that can be used to train drivers on alertness, unexpected actions of other drivers, and related topics.

To provide enhanced crash avoidance for driver and vehicle.

To help anticipate danger for drivers and then be able to share this information with other drivers.

To provide a danger-of-collision distance that is sensitive to the immediate desires of the driver and responsive to current driving conditions.

To provide police, emergency, and maintenance crews more information for response, planning, and traffic and incident reconstruction.

To provide useful sensing, processing, and triggering activities based on driver activity that other systems are not designed to monitor, calculate, or use.

To use all of the above information in ways that can better serve the driver, the vehicle, the traffic, and the road through means such as improved public literature, driver education courses (including simulators), and better agency planning and response.

The present invention is intended to meet these needs.

SUMMARY OF THE INVENTION

The driver, vehicle, and traffic information system is intended to provide drivers, their vehicles, and all agencies that monitor traffic with more information that can be readily assessed and used. It is an information system that is designed to stand alone or to be incorporated with other systems that can use the derived information. It is intended to provide a crash avoidance system and enhance driver safety and traffic flow. After adding more driver information and response time for the driver, the information system should substantially enhance safe driving. It can be a self-contained system on a single vehicle and the data can also be exchanged with other vehicles and traffic monitoring agencies to provide an integrated system. It can address many traffic situations in an anticipatory means. Although braking is generally seen to be more important than providing more acceleration in the effect on other drivers in the immediate driving environment, there is no purposeful exclusion of monitoring the operation of the accelerator pedal in this invention.

A new set of factors is being addressed in providing information that can be used to help improve the driving environment. These factors are not currently sensed nor calculated for today's drivers nor vehicles. These factors include: the position, motion, direction, and acceleration of the feet (and any other article under the dash environment) that are used to control the acceleration and deceleration of a vehicle. This information system will also provide information on the drowsiness, alertness, and responsiveness of the driver, as well as provide additional information to other systems that monitor driver performance.

The provided information will be used to show how a driver responds to the driving environment. With this, the immediate driver will be informed as to how he or she is responding to traffic in real-time conditions. Other drivers will be informed of possible maneuvers of the immediate driver based on foot motions and other perceived data that would normally indicate that a change in vehicle speed or direction may be about to take place. Data that indicates normal non-quick or non-emergency maneuvering would not necessarily be transmitted to other vehicles or recipients. The information will be provided in a format that will provide additional time for drivers to react to the anticipated maneuvering of the other drivers.

Brake lights, as used today, have been around for many years. Drivers from behind and to the side observe brake lights and process the input according to previous experience and instruction. Upon seeing the lights, drivers assume that the driver in the other car is slowing for any of a number of reasons. The brake light does not offer any intelligent information beyond that the brake system of the car has been activated or that the brake pedal has started its journey to the bottom of its path and that the slowing action may begin soon. The driver from behind needs to decide what the effect is going to be from the vehicle ahead slowing or stopping, although much thought in this area is automatic by the driver. If observable from a distance and if not blocked by a vehicle body pillar or some other obstacle, observation of the orientation of the head of the driver activating the brake lights would probably add significant insight to the immediate driver that could be used to the following driver's own driving and safety benefit. The information system does not propose to show the reason why signals provided by it are being produced. However, the system will provide enough additional time in many situations so that drivers may be given additional time to respond in a safe manner. There are many other related benefits.

How does it work?

The information system is designed to monitor the placement and movement of the driver's feet. The system starts monitoring as soon as the vehicle is started, usually as the driver has the foot on the accelerator pedal. The system then monitors the driver as the foot is moved from the accelerator pedal to the brake pedal to apply brakes to the car in the driver's preparation of the vehicle being put into forward or reverse gear. After the driver surveys the surrounding area for all factors that relate to a safe departure and possible entry into a flow of traffic or an area where pedestrians may be, the driver puts the vehicle in gear and moves the foot over to the accelerator pedal. During the trip, the driver accelerates, slows, stops, turns, and merges to meet all the requirements for a safe trip. And during the entire trip, the driver's feet are monitored, registering their position, movement, speed, and acceleration.

Drivers gain experience as they drive, becoming more accustomed to vehicle operations, the driving environment, and to general driving process. Acceleration, braking, steering, and other functions of the vehicle, such as radios, power windows, and power locks, become second nature. As a driver approaches a new or potentially dangerous situation, the foot of the driver may back off of the accelerator and even move a little toward the brake pedal, possibly imperceptibly and maybe unknown to the driver. It is to be expected that a driver will maneuver the operating foot in response to match the traffic flow, the route taken, pedestrians, and other driving factors. In responding to a situation, it is hoped that other drivers will not be caught in surprise as to the action of an individual driver since there can be a resulting snowballing effect. Vehicles may share the road together but each driver will respond to the road as he or she sees or perceives it.

Another example of a driver possibly expecting the need to stop is exhibited by the hovering of a driver's foot over the brake pedal while anticipating the possible need of stopping. The driver is possibly primed for an emergency maneuver that may or may not be expected to occur. The hovering of the driver's foot over the brake pedal would provide the driver a quicker response time to depress the brake pedal in at least two ways. The first way is by having the foot directly over the brake whereby the lead driver does not need the extra time to move the operating foot to the pedal. The second is by the other drivers not having an equal time to respond to an event that would first require the driver to identify the event as possibly dangerous before moving the operating foot over to the brake pedal. Response times can be critical if drivers do not normally provide themselves with sufficient braking or maneuvering distance. The driver in front with a hovering foot over the brake pedal will have a better chance at avoiding dangers ahead but also opens an increased possibility for drivers behind to hit his or her car. The information system could inform other drivers that an otherwise unforeseeable maneuver may be about to happen.

The legs and feet of the driver will be sensed and monitored. Except for debilitating circumstances, most drivers have two legs and feet with one foot (with its accompanying leg) being the predominant operator. It provides both acceleration and brake input to the vehicle. However, the other foot may respond in situations such as when the driver is depressing the brake pedal with both feet. Another situation to be considered is the case where the driver uses the right foot for control of the accelerator and may use either the right or the left foot for control of the brakes. And in the case of drivers who may use a cane or other device, the system monitors any special hardware that will intrude into the monitored area. The system monitors the entire area surrounding the operation area so that anything that enters the area and which may have a possibility of affecting the operation of the brake or accelerator pedal is watched.

The information system monitors several different factors in its assessment of actual or expected maneuvers and maintains separate registers to keep track of each. The system tracks all motion to provide a fuller database to track what the driver is doing and what he has done. And if a certain number of counts are in a register, such as for tracking 'anticipated maneuvering', or if a certain threshold for foot speed or acceleration are detected, then the information system will provide an appropriate signal to the driver, vehicle, and traffic. See FIG. 5 to see how the information system can measure 'anticipation' in one way. There will be cases where the information system cannot deduce a hazardous situation by itself, but when integrated with input from other systems that provide data on traction, danger-of-collision distances, vehicle speed, etc., the combined system calculations may trigger appropriate alarms or vehicle system operation actions.

The information system can work with a single vehicle and can provide certain kinds of information to a solitary driver. As more vehicles with the information system (or with parts of its input in the logic loops of other systems) are in the vicinity of each other, then the scope of coverage is increased. As intelligent road infrastructures develop, the information from each vehicle can be more easily incorporated into other traffic information systems. And once a vehicle leaves a road serviced by an infrastructure or frequented by similarly equipped vehicles, the information system continues to work, though in a less complete mode. There are no special skills associated with the driver's use of the information system.

Derivation of information

The data received by the information system is processed in several ways. One is to measure the position of the operating foot. For example, is the foot over the accelerator or the brake pedal, or is it somewhere in between? And if the foot is in the immediate vicinity of the pedal, is it over the pedal or is it in an engaged position, and to what degree? This position gives guidance as to what maneuvering is taking place and the distance that the foot needs to travel before use of the other operating pedal.

The information system also measures the direction of horizontal foot travel as the driver changes foot directions in the acceleration and braking of the vehicle. For example, the information system would detect if a driver's foot is traveling toward the accelerator when it should be heading toward the brake pedal and provide an appropriate warning. The warning could be calculated when the foot direction is compared to input provided by another system that indicates a certain maneuver, such as accelerating or braking, should be performed. The warning could be generated by receipt of a signal from a system that shares information on changing of traffic light signals, impending front-end collision, and related.

The direction of foot travel while engaged with the brake or accelerator pedal is also measured. It reveals the depression of the brake and accelerator pedals, as well as the foot moving back to allow the pedals return to their normal positions.

The measurement of horizontal foot speed provides information on how fast the operator's foot is travelling from one location over to a pedal area. Normal foot speeds do not usually indicate a quick need to accelerate or stop. If a driver is making a normal move toward a pedal, then it may be assumed, based on other factors, that the acceleration/braking that is desired is not the result of an urgent need. An urgent need by one driver may result in urgent needs for all the drivers following his or her car. It is readily known that the speed of a driver's foot while moving over to a pedal can be indicative of the expected level of activation of that pedal; therefore if a driver is quickly moving the foot over to the brake, then it can assumed that the driver may just as quickly activate the brake with the same downward speed once the foot reaches the pedal. Vehicle speed, weather conditions, road traction, time of day, and other parameters can be used for further analysis for a driver's or vehicle system's use if provided by other sources. See FIG. 6 for a sample of how the information system, when providing information on horizontal foot speed and used in an anticipatory manner, can be used with a system that monitors road traction.

The measurement of foot speed while operating a pedal will provide input as to how fast the driver intends to accelerate, release acceleration, brake, or release braking. One of the more important factors is the speed of brake pedal depression since drivers rarely need to concern themselves with other drivers quickly leaving them behind; this latter case may be more of a concern for safety farther down the road. Excessive speed of activation of either pedal could cause a loss of traction with the road surface even if the road surface is in optimal condition. If a factor such as degraded road traction (oil, snow, etc., on the road) is sensed by another system and this information can be entered into the calculation, then the driver could be given a warning if the driver is perceived as depressing either the accelerator or the brake pedal too quickly.

Measurement of the horizontal acceleration of the foot provides data when a driver's foot begins movement, changes directions, and changes the speed of movement. This provides data when calculating how much slower or sooner an upcoming pedal actuation may take place. Information system triggering will normally occur whenever the foot accelerates to a pedal area faster than a set rate. However if a driver slowed the foot's motion to a certain pedal position, this could also trigger a signal to a driver display. The measurement can be very useful when used in providing advance signaling to other drivers or in the possible pre-readying of safety systems such as seatbelts which can be made to apply tension to the straps to prepare occupants for a possible collision.

The acceleration of a driver's foot on the operating pedals can also be used for calculating actual and expected vehicle response. This information would be useful in determining that a driver has more than a casual need to accelerate or brake. If a driver quickly increased the braking force on the vehicle, then drivers behind would need to know that although their initial observation was that the car ahead was slowly stopping, the information provided by the information system would now indicate that the driver ahead has now decided to stop quicker.

Usefulness to driver

How are driver's to obtain information from a system that tracks the feet? This is unlike systems that can use video or reflected wave input to discriminate oncoming vehicles and then track the oncoming vehicles using comparisons of distances, times, and other factors, although there may be shortcomings in their use in heavy traffic. It is also unlike systems that can measure actual or expected road traction based on the material being sensed or the measured force on some component of the drive system.

The driver, vehicle, and traffic information system takes the approach that there is not always a one-to-one relationship between the conditions (as they actually are or as they are perceived by the operator) and the actual maneuvering which happens on the road. For example, if a large dog almost entering the roadway ahead is seen by a group of fast-moving drivers, there will be a variety of responses as determined by how each driver sees the potential danger. And if any of the drivers, especially at the front of the group, decides to quickly brake or otherwise maneuver, then all the rest of the drivers, especially to the rear, will need to be able to detect and maneuver in response.

If a measured foot position or motion parameter can be seen to be associated with similar activities that are likely to happen in similar circumstances or with results that happen in a similar time related envelope, then the measured parameter can be useful. An example of this is the collection of braking, steering, and acceleration. Just as the driver uses them together in normal driving, the driver will also use these activities when performing emergency or evasive maneuvers. A vehicle that is quickly stopping ahead may cause a driver to slow, to reduce the speed of potential impact, and to steer, to provide possible additional clearance as needed.

A driver uses cruise control to provide a steady speed with a reduced effort and to allow the relaxation of the legs, especially during longer drivers. A driver can usually disengage the cruise control by the hitting of the brake pedal. However, in quick or emergency maneuvering the driver's leg would not be ready for action. The information system would detect the initial rush of the operator's leg and foot and proceed to automatically disengage the cruise control. With cruise control, the forward speed is kept steady until the brake, or some other mechanical/electrical input is applied, while the vehicle not using cruise control automatically allows the throttle control to release as the operating foot proceeds to move over to the brake pedal. As more vehicles are incorporating ways of allowing a driver not to have to keep the foot on the accelerator pedal, the information system would allow the driver to more readily respond to highway conditions.

Driving, stress, and health

The information system can detect and monitor symptoms that may be indicative of stress, a major problem for many drivers. This can be given to the driver of the immediate vehicle or it can be communicated to a monitoring agency with roadside or other wireless communication. Likewise, the information can be stored for later use. It may begin while driving or before the driver has even begun to enter the vehicle. A number of factors can serve to cause stress and these include a headache, heavy traffic, a late start, and aggravating music from adjacent vehicles. But whatever the cause of the initial stress, certain traffic patterns can aggravate the stress.

A common pattern when a driver is under stress is to drive a little more nervously, which causes its own attending problems. The driver may continuously shift foot directions and activate foot pedals, without actually following through with actuation of the pedals that the foot starts toward. The driver may not even be aware of the stress; many individuals can handle stress in a better fashion if they are made aware its apparent presence. The information system detects and monitors the nervous twitches, as well as the apparent well-planned slow movements of a driver who is traveling in friendly traffic. The continued up and down actuation of a pedal can also be indicative of a driver who has become nervous. The information system will assign and track values for the direction of the foot, the speed of the foot and accompanying acceleration, any perceived hesitation in movement, and the resultant action.

A driver that has been determined to possibly be suffering from stress or nervousness can be notified to take a break from driving, change routes, lower any personal tensions within the vehicle (pets, other people, items that may break, etc.), turn the radio to soothing music, or just let loose of the tension. The vehicle could even be produced to automatically lower the volume of any vehicle audio system if a driver has been determined to have elevated stress. An individual's doctor can also download the information to see how the driver is reacting to traffic and stress. Appropriate guidance on a driver's habits or patterns, and factors such as time of day, route, and riding partners, could be given to the patient. Recording of the driver's information system log could provide association of real-time traffic situations and locations for better analysis. Drivers under stress may respond quicker than expected and this may endanger other drivers.

Outbound communication

Communications to other drivers, vehicles, and traffic monitoring authorities can be made in a variety of ways. A primary means of communication will be the use of brake or special lights. If a brake light assembly is to be used, then a special flashing or color combination would be required. This could be used in situations where information drivers in close proximity, primarily to the rear, could use the information, such as for expected stopping. A special light would need to be easily identifiable by other drivers.

Wireless transmission would be another means of communication. This would provide information sharing where the information needs to be shared with more than just the vehicles to the immediate rear, although vehicles to the immediate rear could still access the information. It would also provide input at those times when a vehicle that detects a situation of concern is out of sight of other cars, and yet the input is deemed important enough to be shared with others not in line-of-sight viewing. A roaming area network would work with vehicles that are on the same stretch of road or in the same locality, although possibly for a short time. The roaming area network would also be able to transmit to a roadside station that either processes the information directly or transmits to a more central facility. The transferred information would not need to be restricted to fields such as drivers on a certain stretch of road being extremely anxious about their current situation, but could include information regarding quick responses to traffic conditions such as accidents and concern-raising articles in the road. If a large number of some counts are received by a traffic authority, this could be indicative of a situation that is affecting many drivers; this would trigger a response for further investigation whether by camera, helicopter, or crew inspection on site. The location of vehicles that are emitting signals about possible dangerous conditions, general road hazards, and sites of concern would be decided by technologies such as those currently being used for emergency alert systems and the identification of those roadside stations that receive the data from the vehicles. Transfer to satellites could also be used; this would be important where roadside receivers are not available or are spaced far apart.

Inbound communication

Inbound communication is used to provide information to a driver in a vehicle or the systems in the vehicle that can make use of the information. These signals would provide input that may be used to alert the driver of various situations. A primary means of receiving input is through the observation of lighting on the back of a preceding vehicle. However, a driver might also be aware of a vehicle coming up from behind with its headlights automatically flashing if the approaching driver has been calculated to be braking in a panic, especially if the vehicle also has a system that provides input if there is insufficient distance for safely stopping. Chimes and icons are other means that can be used to supply signals for increased driver alertness or to supply more distinct data such as severe traffic conditions ahead for those drivers receiving the message.

Depending on the vehicle capabilities and the transmitted signal, the driver and vehicle systems could receive general information such as the need for increased alertness. Or the provided information could be more specific and que the driver's navigation system to pick an alternate route. The update could be triggered by the generation of information system data provided by surrounding vehicles. Or the update to the navigation system could be more general as provided by a traffic monitoring agency and suggest that drivers who have a lower level of tolerance for stress (and entered as such into the driver's operating system profile) have their own navigation systems provide a more amenable routing (with the navigation system tailored to the driver for stress). This is an example of how information originally provided by the information system, and which is then processed by a traffic authority and deemed appropriate and informative to drivers or vehicle systems, can be made useful. Graphical displays, such as used by navigation systems, could be used to display information generated by the information system.

The transmission of traffic authority information is not necessarily limited to the original providers of the data nor only to the drivers and vehicles that have the potential to generate the original data. Information can be provided by any means that allows for usage. Examples of such communication would be signs that provide real-time traffic information, updates provided by commercial entities, and others.

Benefits

Many benefits are possible for drivers, their vehicles (avoidance of collision damage), and traffic as a whole. The information system can provide data to other systems for incorporation into their logic loops.

The information system can be used to provide input to drivers about vehicles and objects of concern in narrow tunnels or emerging from under narrow overpasses. Other systems that use emitted waves such as radar would tend to get too much reflection from surrounding structures and thereby not have the ability to isolate vehicles or objects of concern. Systems that use video may have difficulty separating and isolating potential targets of concern, especially in heavy traffic.

The information system can be used to alert a driver of vehicles in other lanes that may be on the verge of changing speed (braking) or directions. See FIG. 9 as an example of how the information system can be used to help a driver determine if another vehicle is going to change lanes ahead of his or her own car, especially when drivers may be already inundated with information all around them. A driver may already be inundated with input from the traffic, and may be overloaded with input when it comes to driving in hectic or very busy traffic. The signal to the driver from the information system would not need to be loud or flash brightly in front of the driver; a simple dash icon with a chime could indicate that increased alertness may be required. However if the system is detecting an abundance of input on the possibility of a lot of imminent maneuvering that does not take place immediately, a stronger signal could be sent to the driver that extra alertness may be required. The information system could send a signal to the vehicle's seatbelt system. This could trigger a tightening of the seatbelts and provide a frontwards resistance so that all occupants could be in a more rearward position in anticipation of possible impact conditions; the seatbelt may even pull the passengers to the upright position. The brakes could even be pre-readied for quick actuation so as to minimize any normal working clearance between friction members (shoes and drums; rotors and pads). This would have the effect of the brake components having less distance to travel in case of emergency braking. And if an airbag system could pre-ready itself for activation without degrading itself for future use, the system could be closer to activation if needed.

The information system can help prevent the premature wearing out of brakes and related components by alerting the driver that the foot is continually activating the brake. Likewise, the driver can be alerted whenever a braking sequence is accomplished in a hurried manner. Quick braking, necessary or not, shortens the life of brake linings, tires, and related vehicle equipment. The use of hurried braking could also signify that the driver was not alert and was therefore not ready for non-hurried response.

Driver concern about road conditions could be registered and the concern could be passed on to following vehicles and any monitoring authority that could provide traffic area updates as appropriate. Items such as debris, obstacles, and potholes could trigger an alarm from the immediate vehicle if the driver's concern is enough to warrant a strong response from the driver. Or, an alarm or a requirement for investigation could be generated by a monitoring authority if there were enough low-level responses by drivers. Even items that would normally not be detected by other forward-looking systems would bring forth responses deemed as appropriate by the driver. These would include paper bags possibly containing hazardous items, small cardboard boxes, large plastic sheets, animals such as dogs and turtles, and whatever may emerge from under the car immediately ahead. The same could be applied to long-term inconveniences or short-term ones such as large limbs hanging in traffic after bending from excessive ice or after a wind storm. With the information system, drivers can be alerted before they become startled and possibly endanger themselves and other drivers. If traffic can be notified of a need to slow ahead, then vehicles will not be traveling at speeds where maneuvering to avoid contact can be hazardous.

The information system would allow for less traffic congestion on the highways since drivers provided with relevant information on time will be able to have fewer accidents. Accidents on the roadway can seriously slow or even stop traffic in one or many directions. The information system would work to avoid accidents before their onset and would work to provide the levels of driving frustration to managing authorities who can use the information to identify traffic bottlenecks and related situations. Traffic managers may be provided with advance notice of emergency road and traffic situations and drivers could be suggested to choose alternate routes. This would help prevent an excessive accumulation of vehicles that may clog traffic for a while even after an accident has been cleared. As a result of fewer vehicles being in accidents and fewer vehicles being bogged in the slow or stopped traffic because of the accidents, there is expected to be a fuel savings for drivers, especially when reviewing inner city traffic, interstate highways, major thoroughfares, and all roadways which by the nature of their existence collect large numbers of vehicles. The information would also work after an accident has cleared and drivers are anxious to make up for lost time.

Upon impact, vehicle structure and design work together to protect the occupants of the vehicle from serious personal injury. These include vehicle crush zones, side impact protection, collapsible steering columns, and air bags which work to absorb the energy of any impacting vehicle and those of the occupants. However, the use of these usually assumes that the integrity and safety of the vehicle occupants and the vehicle are already being compromised. The information system will provide information to the driver that will help prevent the need of automatic onboard systems, such as automatic steering, braking, and accelerating, that may make decisions that the driver might not normally make or that may put the occupants and the vehicle at risk in a different but possibly just as dangerous situation.

The information system can provide advance warning of hazardous road conditions to other drivers and to any monitoring traffic agency. This can be especially important for conditions where water running over a road or ice on the pavement can be expected although not actually reported yet. As the driver responds to the driving environment, there are many small roadside clues that the alert driver automatically picks up on and which may give the driver feelings of assurance or of concern. Clues like ice hanging off mailboxes can provide last-second clues to a single driver as the driver goes around a curve and down a hill. If the driver at the head of a group of cars detects a critical clue, does not yet see the need to activate the brakes, but is poised for quick action, then the information system can provide a signal to the following cars. The signal would not be a warning to quickly stop but to alert the drivers following that the driver is possibly anticipating a stop that may affect others; the lead driver would be aware of possible danger and is already primed for brake actuation. As for the driver in the front, he can be signaled by his vehicle that he is possibly in an advanced stage of getting ready to brake. See FIG. 6 for an example of how the information system can be used to aid both the driver and traffic monitors during situations such as when road traction may be compromised. The information system would still be seen as working if investigators sent out to check possible road ice conditions find a fallen limb instead.

In another mode, the driver may have a vehicle which can respond directly to input generated by the information system but which may be calculated by a traffic authority.

The vehicle's throttle and brake systems would respond to signals on a certain stretch of road to slow down or to be more cautious.

The information system's own sensors would be isolated from the environmental degradations that affect many other forward-sensing systems whose sensors are exposed to contaminants (such as grime, salts, and tars), which are exposed to environmental extremes (such as cold and heat), and which may be one of the first components to be compromised in the case of a head-on impact. This is allowed by having the sensors in the same environment as the driver.

The information system would provide a more intelligent driving environment where the driver would not need to see brakelights indicating a 'slowing' message before getting a feel of what the other driver may do, especially where high rates of speed are concerned. Reacting to the signal that the brakes are being actuated as opposed to reacting to the potential that another driver may make a quick stop, even though the driving environment to the vehicles behind may not provide a clue to the preceding driver's actions. The movement of a driver's foot toward the brake pedal would not necessarily trigger the information system to provide warning to following drivers. However, a combination of continued almost-braking and quick movements of the foot could trigger the information alert. With this, the following drivers could provide more distance from the leading vehicle and increase their own alertness. Or an automatic vehicle-following-system could add extra distance to its danger-of-collision distance in preparation of possible imminent emergency maneuvering as perceived by the driver. Each system in a vehicle could receive input and react accordingly in a number of ways.

And since the information system measures the entire volume around the operating pedals of the vehicle, the information system can provide a parallel means of providing input to the brake light in case of a failure somewhere between the brake light switch and where any proposed backup system provided by the information system could connect to the circuit leading to the brake lights.

The information system can be used by police officers and others who want to be able to reconstruct accidents and use it in the processing of charges and assessing of liability . It could provide evidence of a driver's alertness and attempting to respond even if the full foot motion was not completed.

The information system has almost no limit when working with the closing speeds of vehicles, even in heavy traffic, as opposed to some other systems. As long as the driver can see an oncoming vehicle that causes a concern and can then initiate a reaction accordingly to it, the information system will register that the driver has experienced an action which elicited a very fast response and process vehicle system and outgoing information traffic accordingly.

In a scenario such as when a driver is approaching a washed out road, the first driver to reach the washed out section may not be expected to have a good opportunity at avoiding a mishap. With the information system, a signal can be provided to the following vehicles even if the first driver did not have an opportunity to reach the brake pedal or time to safely stop.

Later usefulness of data

The usefulness of the data provided by the information system does not end with its transmission to other vehicles and sites.

The data collected by the traffic monitoring infrastructure can be used to determine how the traffic responds to itself, the road, and the immediate non-road environment. For example, there may be a section of road where drivers act skittish without actually swerving or slowing. Or there may be sections of road where there is extensive activation of the information system because of something actual or perceived but for which the drivers did not follow through with maneuvering or actual braking. The information can also be used to analyze existing roads and to develop better designs in the future.

The data can also be used to determine how the traffic relates to itself such as when there is a larger than expected number of registers at a certain time along a certain road. An investigation may reveal that heavy smoke crosses a road at a certain time of day, although the rest of the driving environment is very driver friendly. Or the rising or setting sun over a particular hill, especially after some change in the adjoining landscape (new/demolished building, harvesting of trees, etc.), may cause concern as the glare greatly distracts and concerns the drivers.

Insurance companies can use the data provided by the information system to better assess liability and adjust the payout of money accordingly, especially for situations where there was no other evidence or where fraud may occur.

For military users, the system would allow the safer transport of troops, vehicle, and cargo to the intended deployment area. Troops in carriers can be better aware of when the driver is going to make quick maneuvering or when the driver is apparently unsure of what is going to happen. Alert troops in the back can provide for better posturing and equipment control before a sudden driver maneuver can cause personal injury or damage to equipment.

Driver training

The driver, vehicle, and traffic information system is designed to provide information on the driver, his vehicle, other vehicles, and the driving environment under more conditions. As such, the driver will learn to use this information to drive more intelligently and with less of a feeling of being such a large target for uncontrollable events. When organized into a complete educational program, the information system could be incorporated to expand basic concepts such as safe and defensive driving. Drivers will better realize that each vehicle is operated by an individual who may not necessarily react the same as other vehicles in a group. The driver will also learn that since he or she can quickly hit the brake pedal even if with no presignal to surrounding drivers, then they will realize that other drivers too will be able to do the same while traveling with them. Most drivers will become safer drivers after initial use and exposure to this system. This will result from a better understanding of other drivers' intentions and the increased total data input. This should be very helpful, especially when it comes to new drivers or drivers having difficulty in avoiding accidents. An outgrowth of this may be that not only do drivers learn to give more leeway for maneuvering of other drivers, but that each driver will be more considerate in giving the leeway necessary for responding to one's own vehicle.

Simulators using similar circuitry to that found in motor vehicles would provide more realistic training for drivers. New, and experience, drivers would discover that survival on the road can be enhanced by being more informed of the driving environment.

Conclusion

The benefits possible from the incorporation of the driver, vehicle, and traffic information system into motor vehicles are many. Additional benefits will become quite obvious as the system is integrated in other vehicle systems. A few of the more obvious ones are: input into throttle position; input into navigation systems which can channel drivers away from roads needing emergency attention, immediate driver anxiety, etc.; providing information for analysis of traffic observers and announcers; pre-priming of safety survival systems such as seatbelts and air bags in anticipation of immediate usage; providing alertness monitoring of the driver; providing nervousness monitoring for drivers so that the driving environment can be modified (lower talk, less debate, etc.), route can be changed, a rest can be taken, etc.; pinpointing areas of concern for drivers such as obstacles, dangerous articles, etc. (including small and nonferrous), and passing the information to authorities for future investigation; preventing unnecessary use of emergency maneuvering by automatic steering, automatic braking, and automatic acceleration and also providing input to help decide their deployment; helping drivers anticipate potential maneuvering especially at times when traffic is fast and hectic; providing input to an audio system to lower or raise the volume according to sensed needs; providing input to allow drivetrain control systems to provide better traction as perceived by a driver; disengaging cruise control and engaging brakes; providing tracking of accidents that almost happened and from which drivers can learn; and providing quick input to drivers as the need to brake quickly arises.

Numerous enhancements and additional interface possibilities will become obvious to one skilled in the art.

DESCRIPTION

The present invention is a system for measuring current activity and predicting possible behavior of a driver to provide useful information to the driver, vehicle systems, and other traffic as determined by the monitoring of the feet and legs and calculating what the possibilities are. The system can stand alone or work in cooperation Faith other systems to share and to provide input. It is to be understood that the configuration of the present invention can vary according to its installation and that all examples are provided to show possibilities, not limitations, on the present invention.

Figure 1:
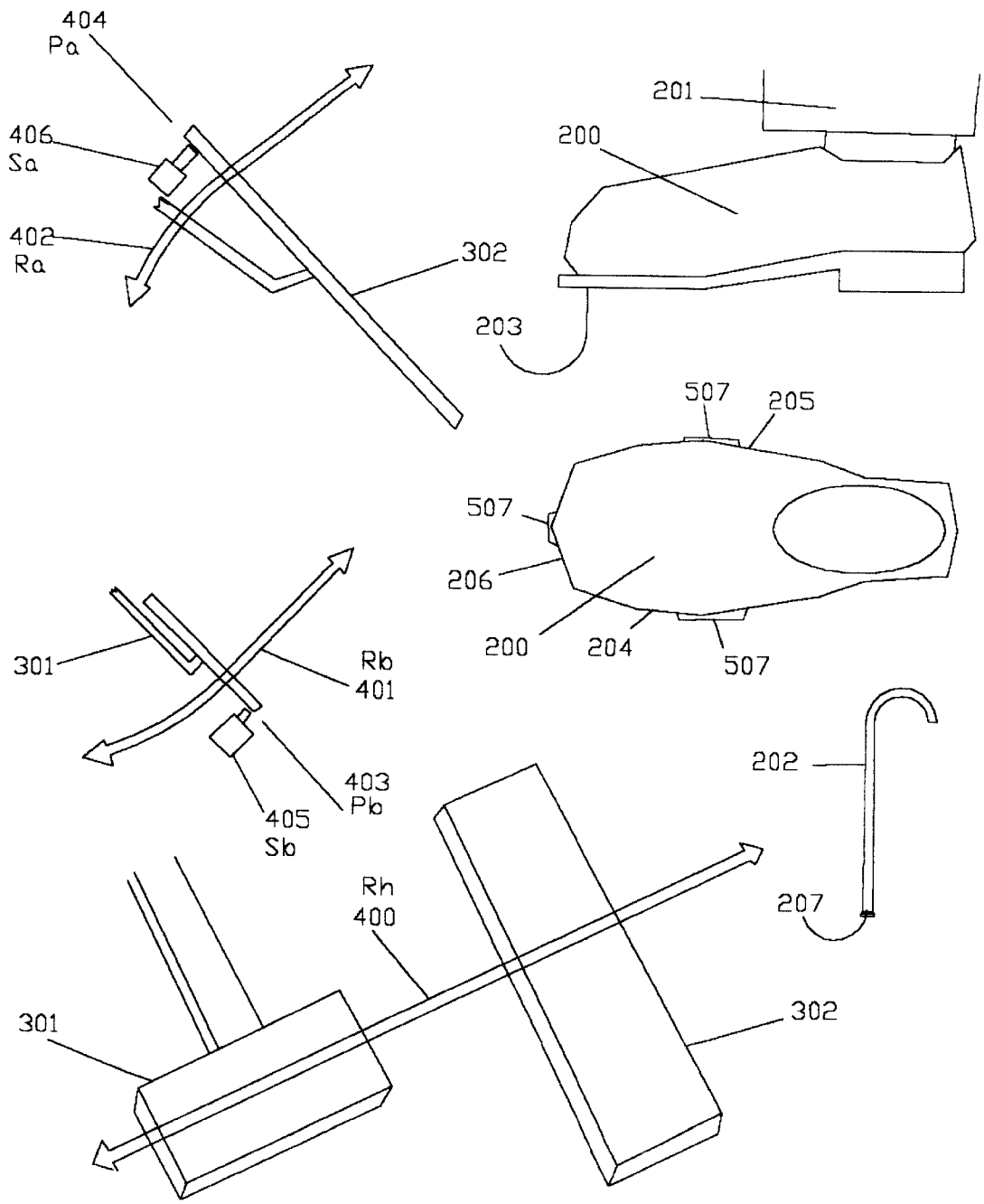
FIG. 1 shows the range of the position and motion monitoring of the information system. It also shows the articles that are normally to be monitored.

FIG. 1 is provided as a view of the scope of the sensing of the information system. Horizontal range (Rh) 400 shows the range of horizontally sensed positions and movement of the driver's foot 200 as the foot moves between the brake pedal 301, the accelerator pedal 302, and to the position to the outer side of each. Brake pedal range (Rb) 401 shows the range of the sensed position and movement of the driver's foot 200 above the brake pedal 301 and through the entire range of operation of the brake pedal 301. The foot bottom 203 provides a reference for determining the distance from the bottom of the foot 200 to the surface of the brake pedal 301 or the accelerator pedal 302. A left side 204, a right side 205, and a front side 206 of the foot 200 provide surfaces that can be sensed for positioning, although as many sides as necessary can be sensed to provide accurate position sensing according to the means of sensing. Accelerator pedal range (Ra) 402 shows the range of the sensed position and movement of the driver's foot 200 above the accelerator pedal 302 and through the entire range of operation of the accelerator pedal 302. A personal reference marker 507 can be attached to the driver's foot 200 to enhance detection by the sensor 500 if there is difficulty in sensing the outline of the foot. A position of the accelerator pedal 302 at which the accelerator pedal 302 provides input to a vehicle system, such as the throttle, is referred to as Pa 404. A switch or sensor that measures actual contact of the foot 200 upon the accelerator pedal 302, such may be mounted on a linkage and may be operated mechanically or by a sensing of the movement of some vehicle component such as the accelerator pedal 302, and which provides sensing is referred to as Sa 406. A switch or sensor that measures actual contact of the foot 200 upon the brake pedal 301, such may be mounted on a linkage and may be operated mechanically or by a sensing of the movement of some vehicle component such as the brake pedal 301 or a hydraulic system and which may be removed from the immediate vicinity of the brake pedal 301, and which provides sensing is referred to as Sb 405. A position of the brake pedal 301 at which the brake pedal 301 provides input to a vehicle system, such as brakes or cruise control, is referred to as Pb 403. The driver's leg 201 is also sensed within the operating area, as well as a cane 202 or other object that enters the operating area and which can therefor affect the operation of the brake pedal 301 and accelerator pedal 302. A foot marker 508 which may provide a point of reference for sensing of the foot but which is not part of the normal foot 200 or footware of the driver can be placed on the foot 200 of a driver to provide more sensitive position sensing although this will not be expected to be necessary. A cane bottom 207 of a cane 202 will provide a surface for tracking the operating surface which can push against the brake pedal 301 or the accelerator pedal 302. Likewise, the side of the cane 202 will be monitored if it moves across the horizontal range 400.

Figure 2:
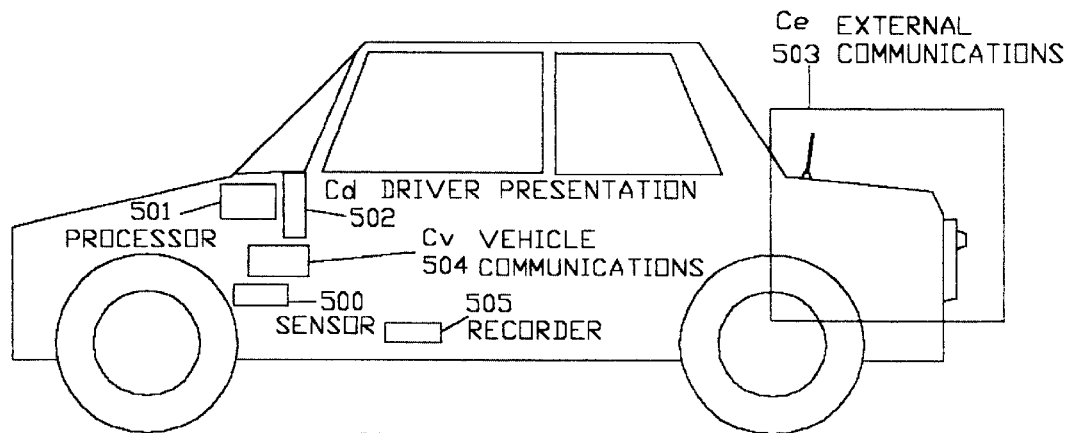
FIG. 2 shows the basic components of the information system. Details are provided in FIGS. 4A and 4B.
Figure 3:
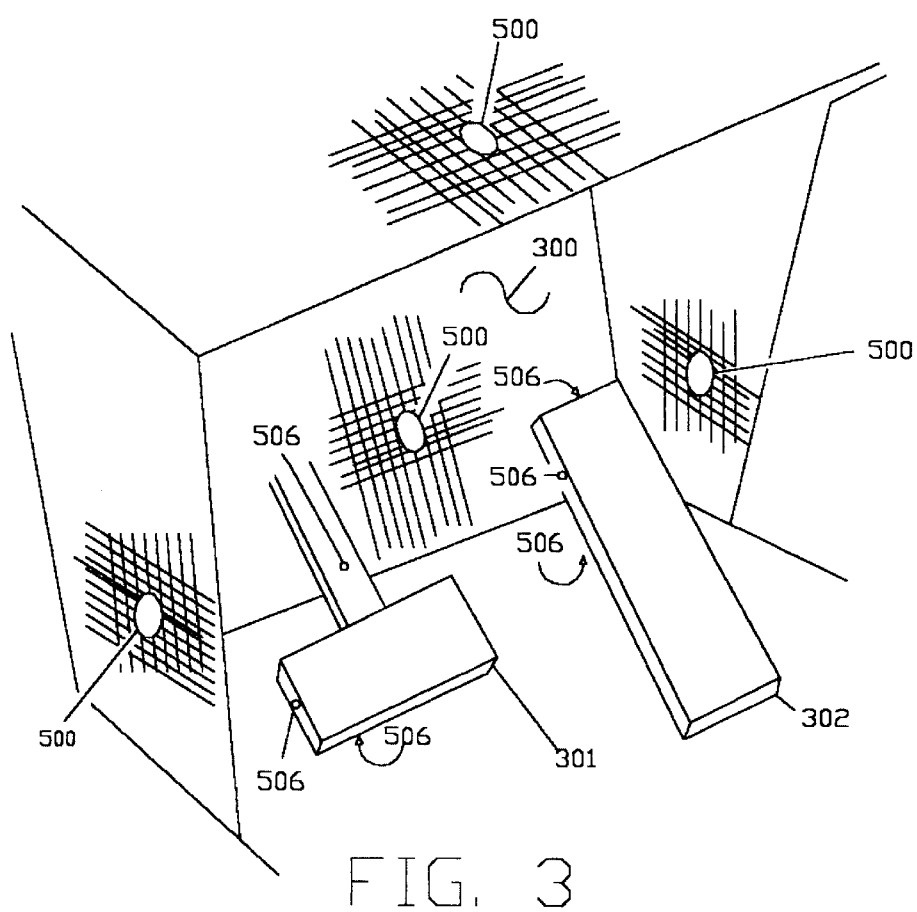
FIG. 3 shows the possible locations for sensors and any reference markers that may be used.

FIG. 2 shows the general components of the information system. A sensor 500 or series of sensors 500 provides the position of the operating feet 200. The sensor 500 needs to be able to detect the shoed foot as well as one which is naked and can be mounted anywhere that allows this function. The use of ultrasonic and microwave means are two ways to measure the foot, but this is not meant to limit the scope of this invention. The sensors are generally are installed in the general proximity of the driver's feet 200 which are usually located under the dash 300 as is shown in FIG. 3. A processor 501 keeps track of the position of the feet through time, provides calculations, and determines which information is sent to which driver presentation or vehicle system; it can also decide when to transfer information to systems that are not within the immediate vehicle. The processor 501 functions can also be incorporated into processing by other systems to save hardware expense or to provide integration with the functions of other systems. A recorder 505 provides the potential of storing other than short-term data. The function of the recorder 505 can be incorporated into any other suitable storage device in a vehicle. There are several ways to provide a presentation to a driver Cd 502. Cd 502 is further detailed in FIGS. 4A and 4B. There is also a means of delivery of processed information to provide input to a vehicle system Cv 504 that can incorporate information from the information system. Cv 504 is further detailed in FIGS. 4A and 4B. An external communications Ce 503 means provides for all communications with outside drivers, vehicles, and traffic monitoring organizations. Ce 503 is further detailed in FIGS. 4A and 4B.

FIG. 3 shows possible locations for the sensors 500 in the operating area 300 under the dash. Locations will primarily be chosen on the ability of a particular sensor type to provide quick and accurate sensing of the operating foot and where there will be limited blocking of sensed data. Component reference markers 506 can be provided to give reference points for the sensing of the foot 200 position. Possible mounting places for the component reference markers 506 include the top, sides, and bottom of the brake pedal 301 and accelerator pedal 302. The style and composition of the component reference marker 506 will depend on the type of sensor 500 that is used. The component reference marker 506 can also provide for occasional recalibration of any distance measurement between the sensor 500 and the accelerator pedal 302 and brake pedal 301. The component reference marked 506 can also be used to remotely sense the accelerator pedal 302 and brake pedal 301 positions.

Figure 4A:
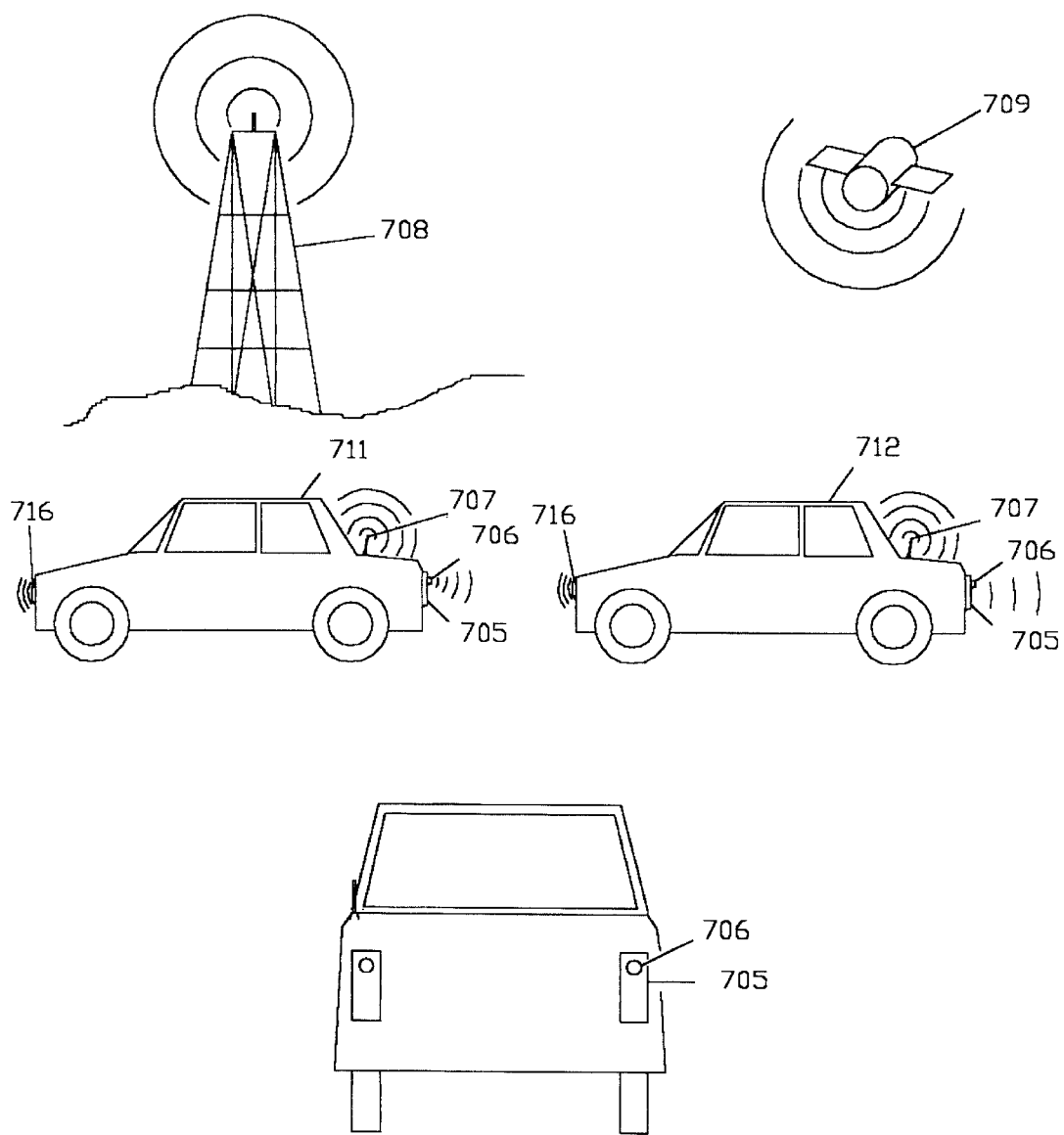
FIGS. 4A and 4B show possible means for the information system to send and receive information.
Figure 4B:
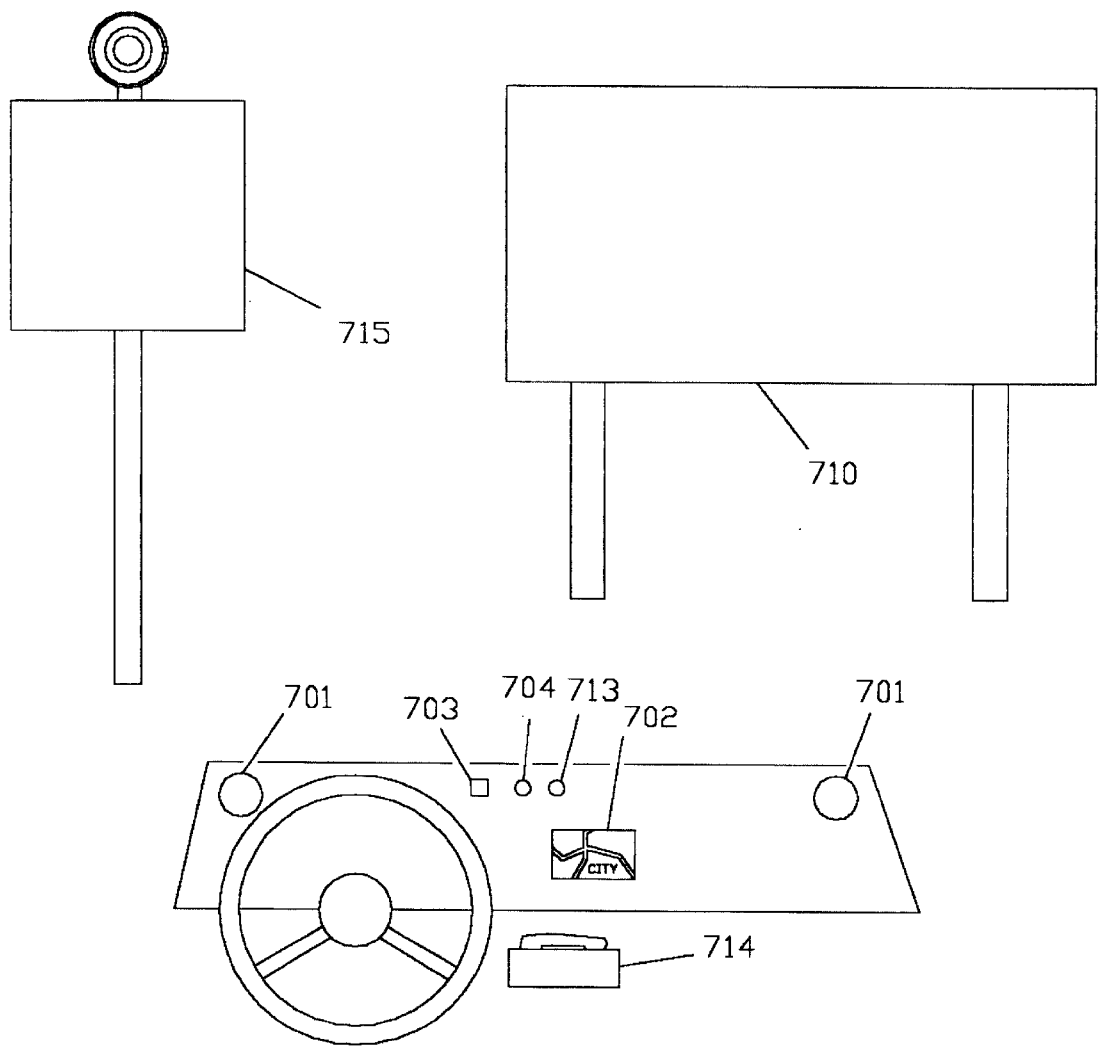

FIG. 4A and FIG. 4B show possible means for the information system to share information with a driver or system of a vehicle 711, with a driver or system of another vehicle 712 which may be following, with a roadside receiving/sending station 708, and with a satellite 709. The style of antenna 707 used would depend on the type of wireless communications employed. An antenna 707 could be used to listen to commercial radio stations that broadcast traffic updates generated from data compiled from information system data collection. A cellular phone 714 could be used for a traffic or other agency to contact personnel to inquire about further information that may be needed after the agency has received a large influx of information system in a short period of time, especially along a certain stretch of road. An antenna 707 is also used with cellular phones, although the antenna 707 would not necessarily be hard mounted on the vehicle 711. A common way to communicate that a driver has been detected as triggering the system is to provide a light signal. The light signal can be provided through a brake light 705. If the signal is presented by a brake light 705 to a following driver, there would need to be some way to ensure that its message would be distinct from that of a regular brake light 705 indication. Another method would be to provide a special lamp 706 or series of lamps 706 that would be dedicated to providing a signal from the information system. Flashing headlights 716 can be used to provide a signal in case the vehicle has potential to cause damage to the rear of other vehicles. A chime 704 is provided to attract the driver's attention, either to an existing condition to which more attention should be given or to notify the driver that there is an update on an icon 703, dash light 713, or some other display already installed in the vehicle such as on a navigation system display 702 which can provide graphic means of giving information. Vehicle radio speakers 701 could also provide updates from commercial and government agencies who have generated reports from data provided by the information system. A roaming area network between a vehicle 711 and another vehicle 712 would link vehicles as long as they are within normal communication range. Communication of the vehicle 711 with the use of a roadside receiving/sending station 708 would allow the sharing of information even though topography would otherwise interfere with communication.

Figure 5:
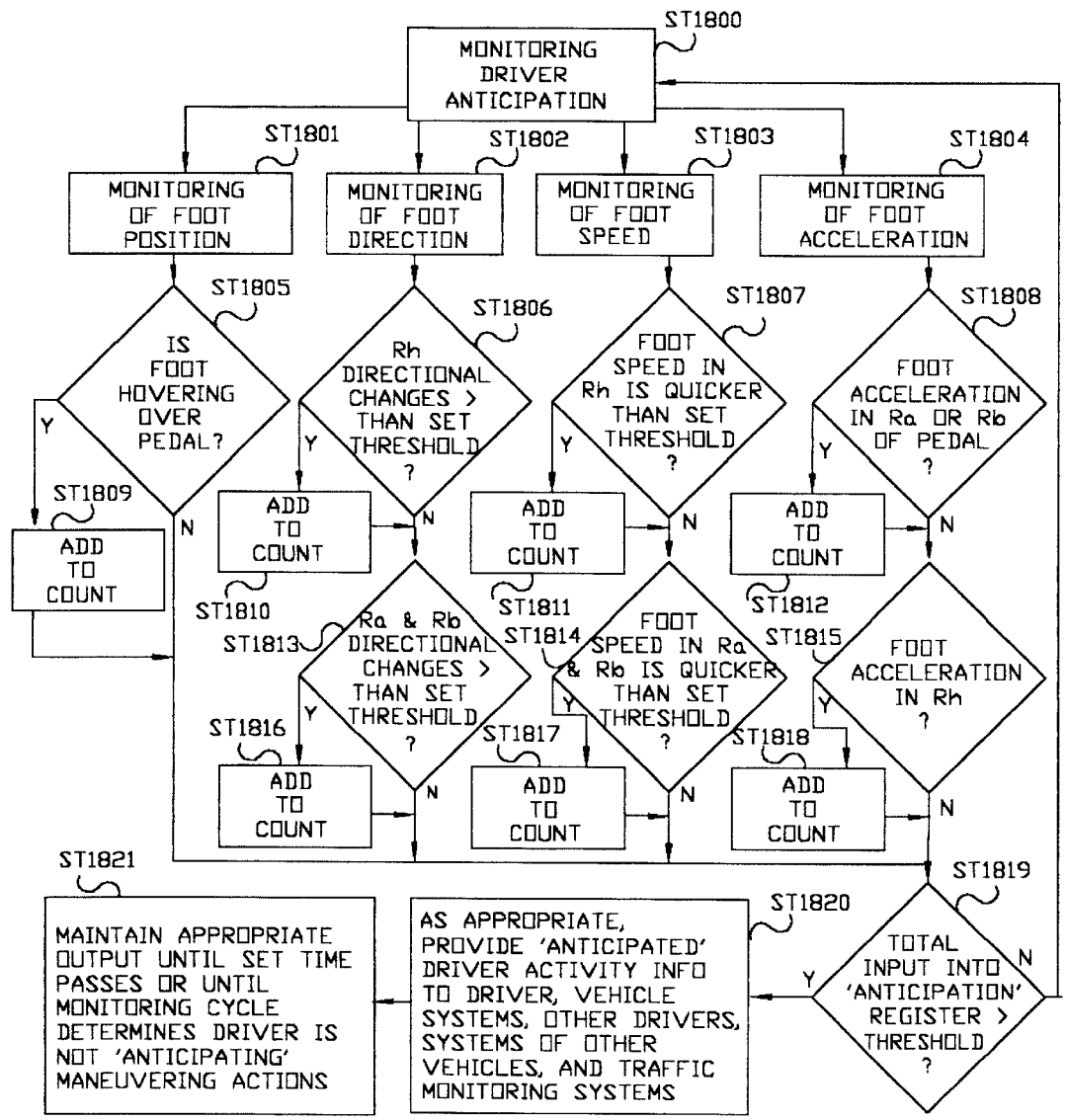
FIG. 5 shows how the information system can measure driver anticipation to provide a measure of anticipated driver activity.

FIG. 5 shows in steps ST1800 through ST1821 how the information system can measure the position and motions of a foot and use the raw data to monitor driver anticipation ST1800. The measured parameters include the monitoring of foot position ST1801, monitoring of foot direction ST1802, monitoring of foot speed ST1803, and monitoring of foot acceleration ST1804. After these parameters are measured, the system decides if the measurement of anticipation is greater than the threshold ST1819. If so, signals are provided to the driver, the vehicle systems, other drivers, systems of other drivers, and traffic monitoring systems as appropriate ST1820. The determination to keep maintain appropriate output ST1821 to receivers of the information will be decided by the passage of a time interval or until the system decides that the driver is not anticipating maneuvering actions.

When looking at the horizontal movement of the foot in the operating area, speed will be used to provide a value to show how fast an operator's foot 200 is moving from one point to another, especially pedal to pedal. If the speed is low, then it can be assumed that the driver is making unrushed decisions for any of a number of reasons, including lack of anxiety and tension, as compared to times the movement of the foot 200 to another position is quick. The relative value of a particular speed will need to be compared to driving conditions as provided by other systems (provided by both onboard and input from systems outside the vehicle) that can provide a ready comparison of the need to make foot operations of a certain speed. For example, a certain speed of the driver's foot 200 in good driving conditions when used by a driver in situations where traction is assumed to be compromised (as provided by a traction monitor system would be looked at differently. The measurement of speed through the operation of a pedal can also be used to measure the expected vehicle response that the driver is aiming to achieve. A slow depression of the brake pedal 301 will provide a reduced vehicle response when slowing as compared to a faster depression. A quick movement by the driver to depress the accelerator could indicate a need to escape a certain situation. The speed and direction of a driver's foot at any particular moment in time cannot be assumed input to be constant.

Acceleration will be used to provide a value to show the change in speed and direction as the foot 200 travels in the operating volume. This also includes the start and stop of any movement as the foot 200 leaves a beginning position or reaches an arrival position. Moving in a horizontal fashion through the operating volume, acceleration can be used to indicate that a potential action to the accelerator pedal 302 or brake pedal 301 may happen sooner than previously calculated due to operator response to the driving environment. This is not meant to rule out muscular reflex actions that the driver may be experiencing but which are not connected to the driving environment; nor does it rule out any other human body response to disease, medicine, intoxicants, or related. Likewise, if an operator's foot 200 decelerates while moving to the other pedal area, then the driver may have received more input or decided that a particular action was not necessary. If the driver's foot 200 increases the speed of the depression of a pedal 301, 302 then the driver may be responding to an intensified need to accelerate or decelerate.

In addition to the sensor data, and depending on the desired complexity of output (and resulting cost) and data exchange with other systems, the information system will use parameters such as road traction, danger-of-collision distances, navigation system input, and others that can be used to provide a more integrated information package for the driver.

The speed and acceleration of foot motion will be provided a relative value. Slower or 'predetermined' action by the driver will register as normal activity. Greater speeds and acceleration will work to indicate the potential of imminent action.

Motions such as the back and forth movement of the foot 200 between pedals in the horizontal range Rh 400 and the up and down action of the pedals through the accelerator pedal range Ra 402 and brake pedal range Rb 401 are normal maneuvers by the driver. However, if the driver continually activates a pedal or moves between pedals, especially within a relatively small defined time frame, then there is the increased chance that the driver is under stress or not sure of what to do. These actions can be used in determining whether a driver may be likely to make a quick decision that may endanger the driver and others.

Another embodiment would be having the processor 501 functions be incorporated with the processors of other systems since the data could be incorporated directly into their operation.

Figure 6:
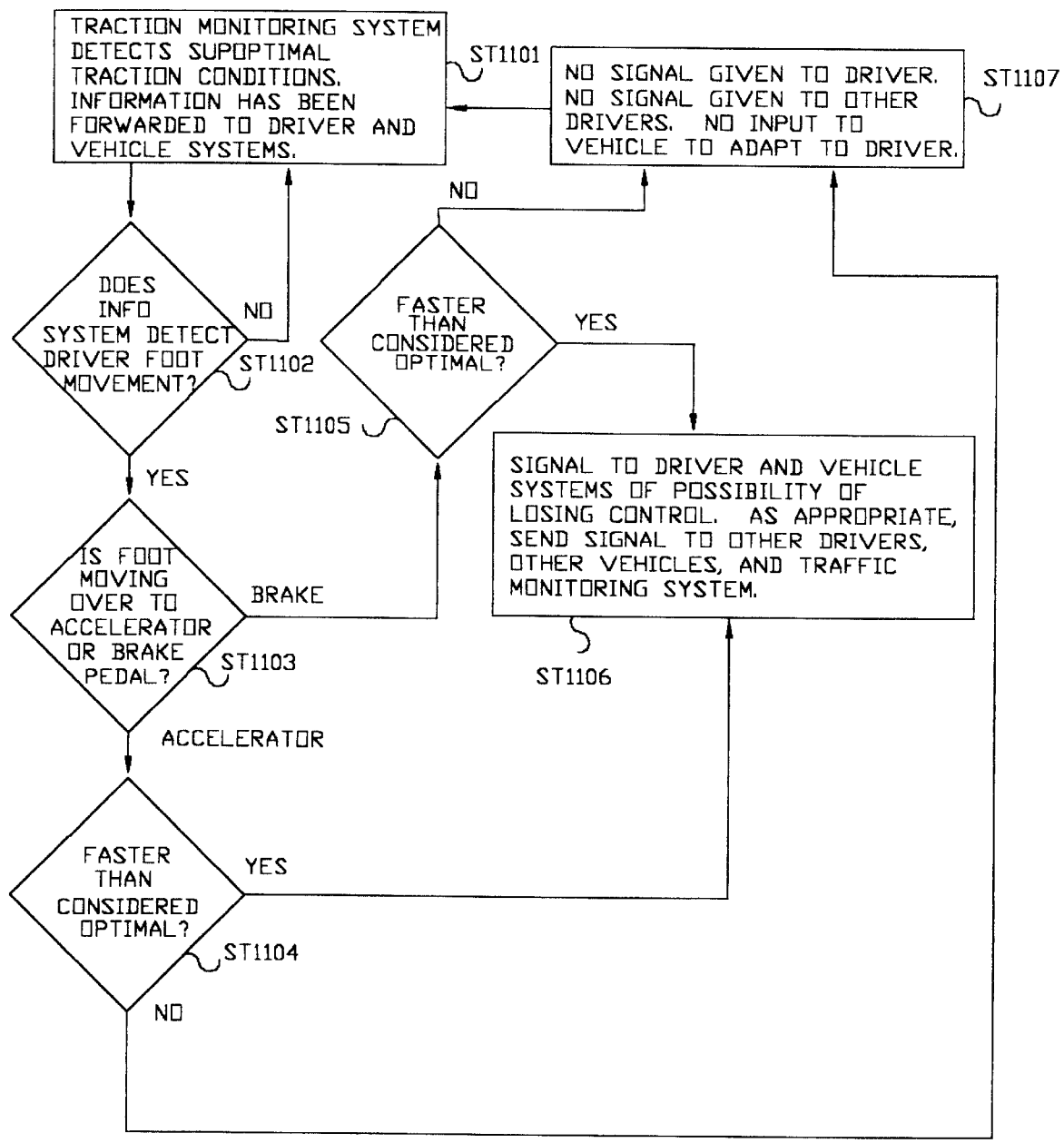
FIG. 6 shows how the information system can be used in conjunction with a system that provides input on road traction.

FIG. 6 shows how the information system can be used in conjunction with traction monitoring systems in steps ST1101 through ST1107. After the traction monitoring system detects that there are suboptimal conditions on the road ST1101, the information system checks to see if the driver is actuating a pedal ST1102 which could degrade any existing traction that the vehicle may have. And if the foot is moving to another pedal ST1103, then the detection of quick movement to that pedal would mean that there is an increased chance of the change in the status of the vehicle's traction as the driver may intend to unsafely accelerate forward or to brake. Signals could be given to the driver if the system detects that a speed change may occur that is not optimal for use under the detected conditions ST1105. A signal to an onboard vehicle system ST1106 could provide input that allows a system monitoring power transfer to the wheels to adapt to the existing traction and to make adjustments so that any potential loss of traction would be minimal.

Figure 7:
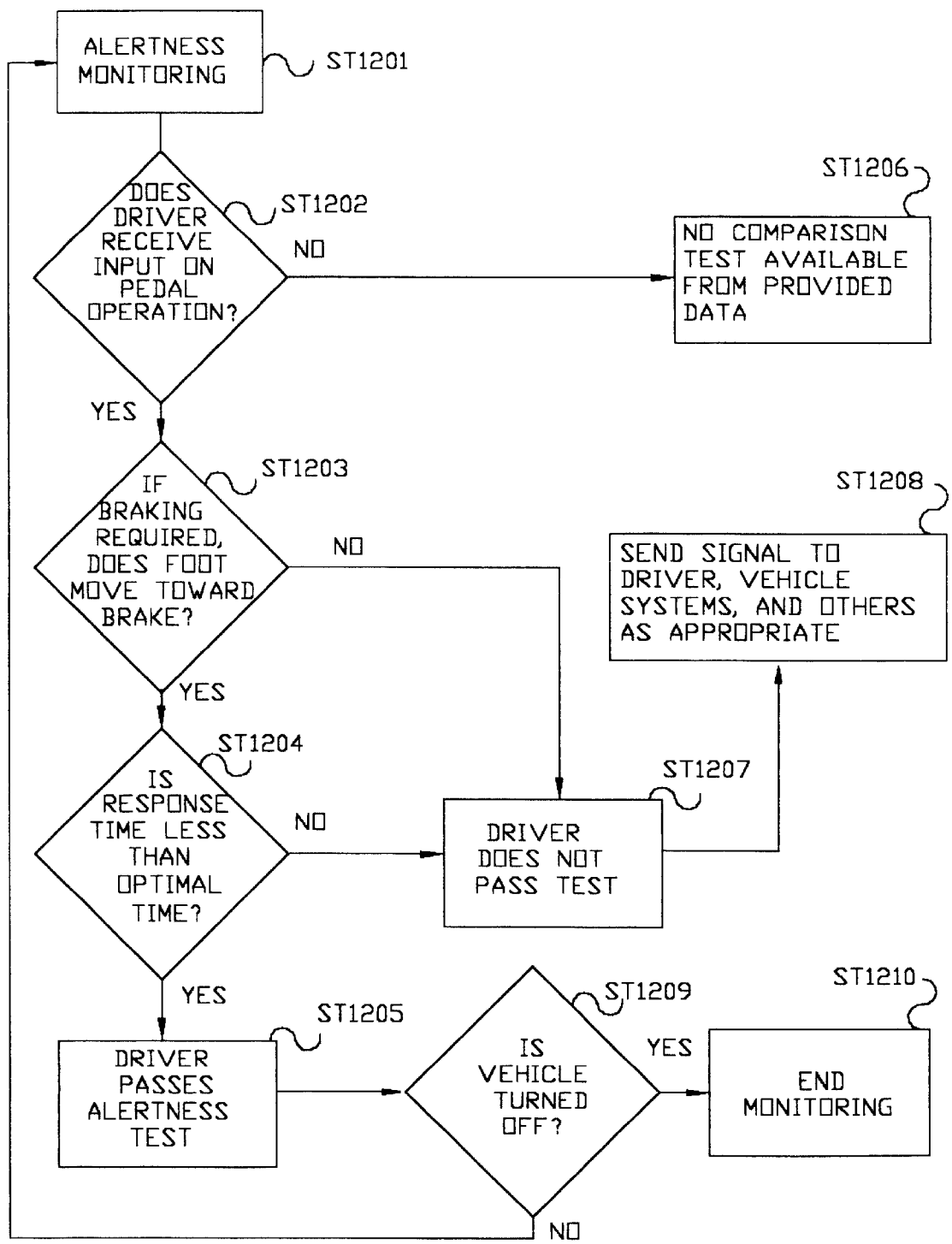
FIG. 7 is a flowchart that shows how the information system can provide an indication of driver alertness.

FIG. 7 shows how the information system can be used to monitor driver alertness in steps ST1201 through ST1210. This embodiment would depend on input from another system to provide real-time analysis of the driver's alertness. A signal from an outside source would provide input to the driver that a speed change is suggested. Factors to be checked include moving the foot, if necessary, to the brake pedal ST1203 and checking the response time for the movement ST1204. If the driver responds quicker than an optimal time ST1204, then the driver passes the test ST1205. However, if the driver fails in responding to a 'signal to move the foot to the brake ST1203 or performs the movement in a time interval that is not considered appropriate for a response ST1204, then the driver does not pass the test ST1207. The information system could also be used to work with input to the driver before use of the vehicle or during driving when other systems in the vehicle are preprogrammed to check for driver alertness.

Figure 8:
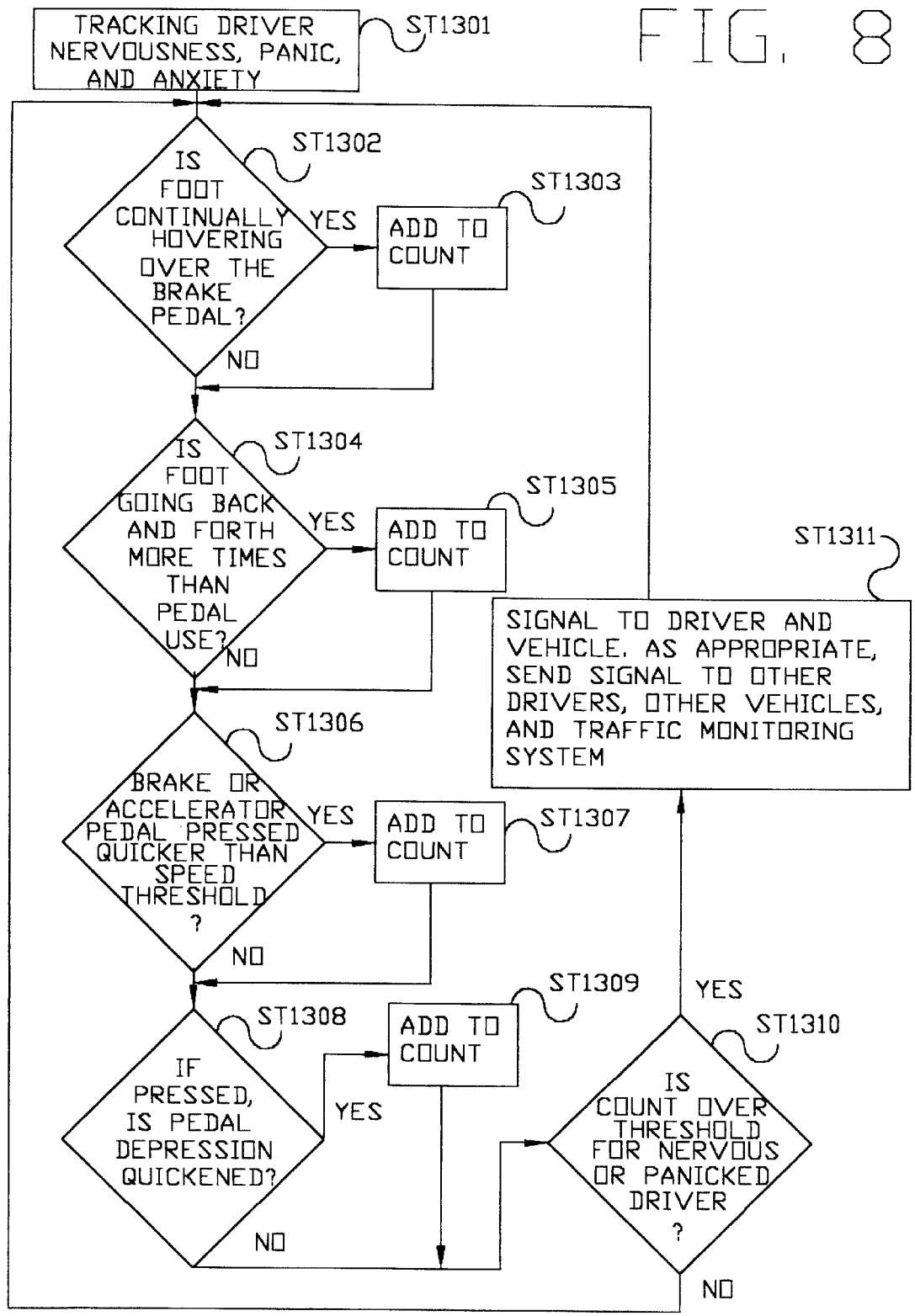
FIG. 8 is a flowchart that shows how the information system can monitor driver nervousness, panic, and anxiety.

FIG. 8 shows an embodiment of the information system being used to monitor driver nervousness, panic, and anxiety in steps ST1301 through ST1311. Factors to be checked include the hovering of the foot over the brake pedal ST1302, the foot moving frequently back and forth between pedals ST1304, pedals being pressed quicker than a set threshold speed ST1306, and the speeding up of pedal depression ST1308. If the driver has accumulated more counts in a register than a threshold limit ST1310, then the driver is notified ST1311 as well as the vehicle systems, other drivers, other vehicles, and a traffic monitoring system as appropriate.

Figure 9:
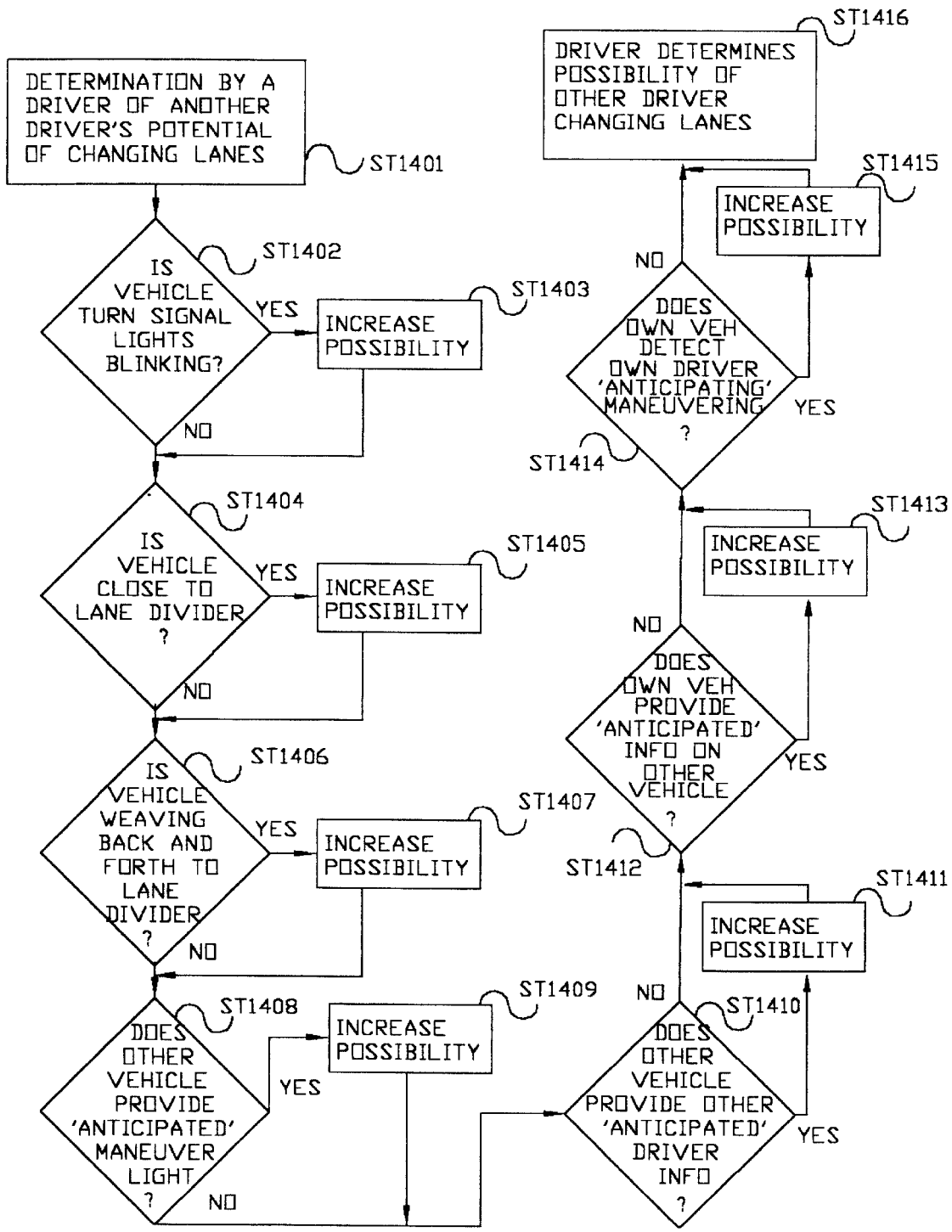
FIG. 9 is a flowchart that shows how a driver can use information from the information system to help determine a maneuver of another driver, here represented by a possible change in lanes.

FIG. 9 shows an embodiment of the information system being used by a driver in the determination of deciding whether another driver is going to change lanes or not according to steps ST1401 through ST1416. Factors that the driver would use include turn signal lights blinking ST1402, the other vehicle being close to the lane divider ST1404, the weaving of the other vehicle ST1406, the display of a light signal ST1408 or other signal ST1410 generated from the other driver's information system suggesting anticipated maneuvering of that driver, the immediate driver's own vehicle displaying information about the driver ahead perhaps anticipating a maneuver ST1412, and the immediate driver's own vehicle detecting that he or she is possibly anticipating maneuvering in response to the driver ahead ST1414.

Figure 10:
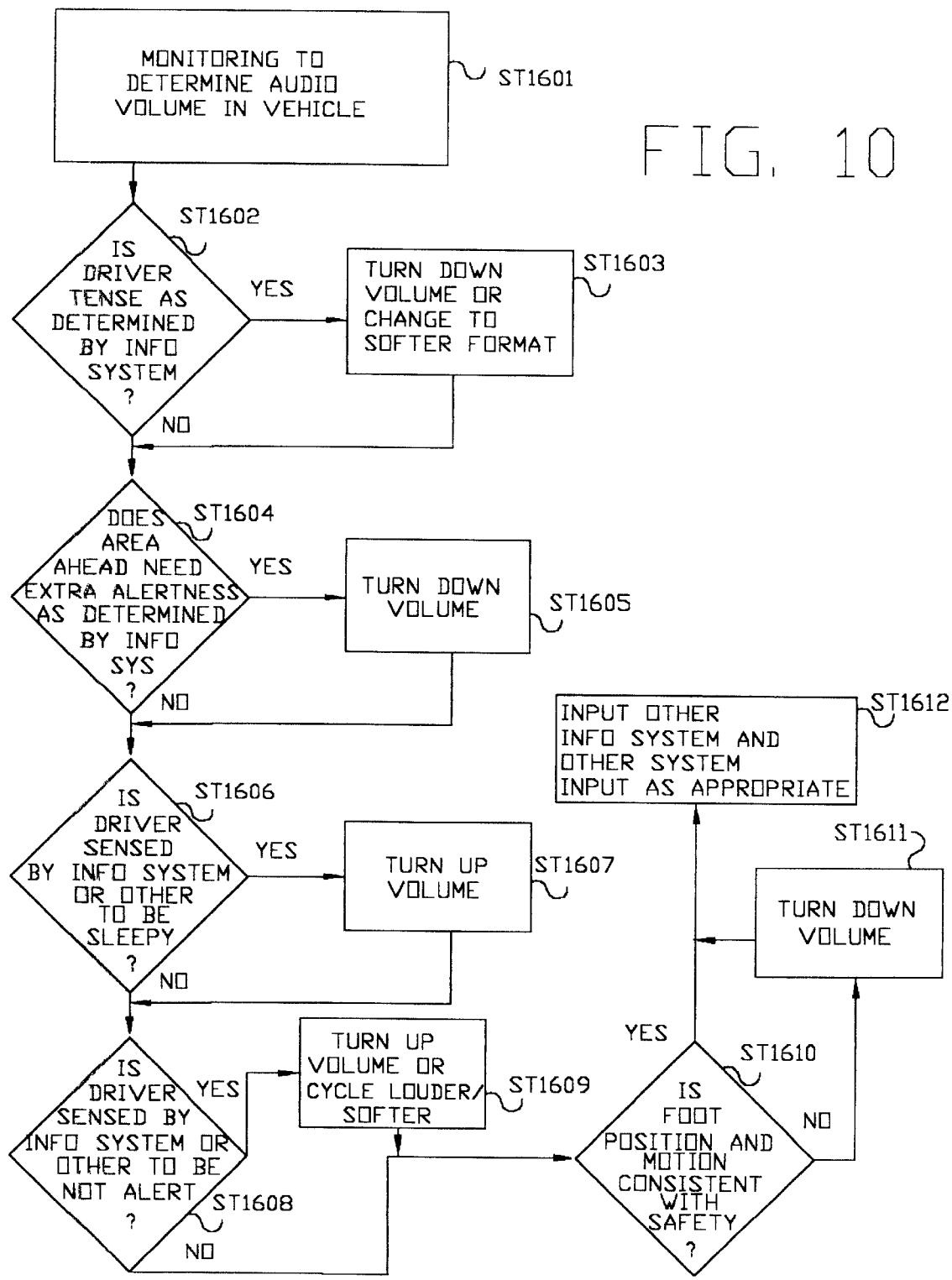
FIG. 10 is a flowchart that shows how the information system can be used to provide input for automatic audio volume adjustment in a vehicle.

FIG. 10 shows how an embodiment of the information system can be used to provide input in the control of the volume of an audio system as shown in steps ST1601 through ST1612. Factors used in the process include the tenseness of the driver as determined by the information system ST1602, the need for extra alertness ahead as provided by other input ST1604, the sensing of the driver to be sleepy by the information system ST1606, the sensing of the driver not be alert as sensed by the information system ST1608, and foot position and motion being consistent with perceived safety ST1610. The volume can be turned up or down to provide a volume level consistent with keeping the driver alert but without distracting him at times when attention is required. If it is determined that the driver is tense as determined by the information system ST1610, then the radio could be prompted to change to a softer format of music as well as adjusting the volume level ST1603.

Figure 11:
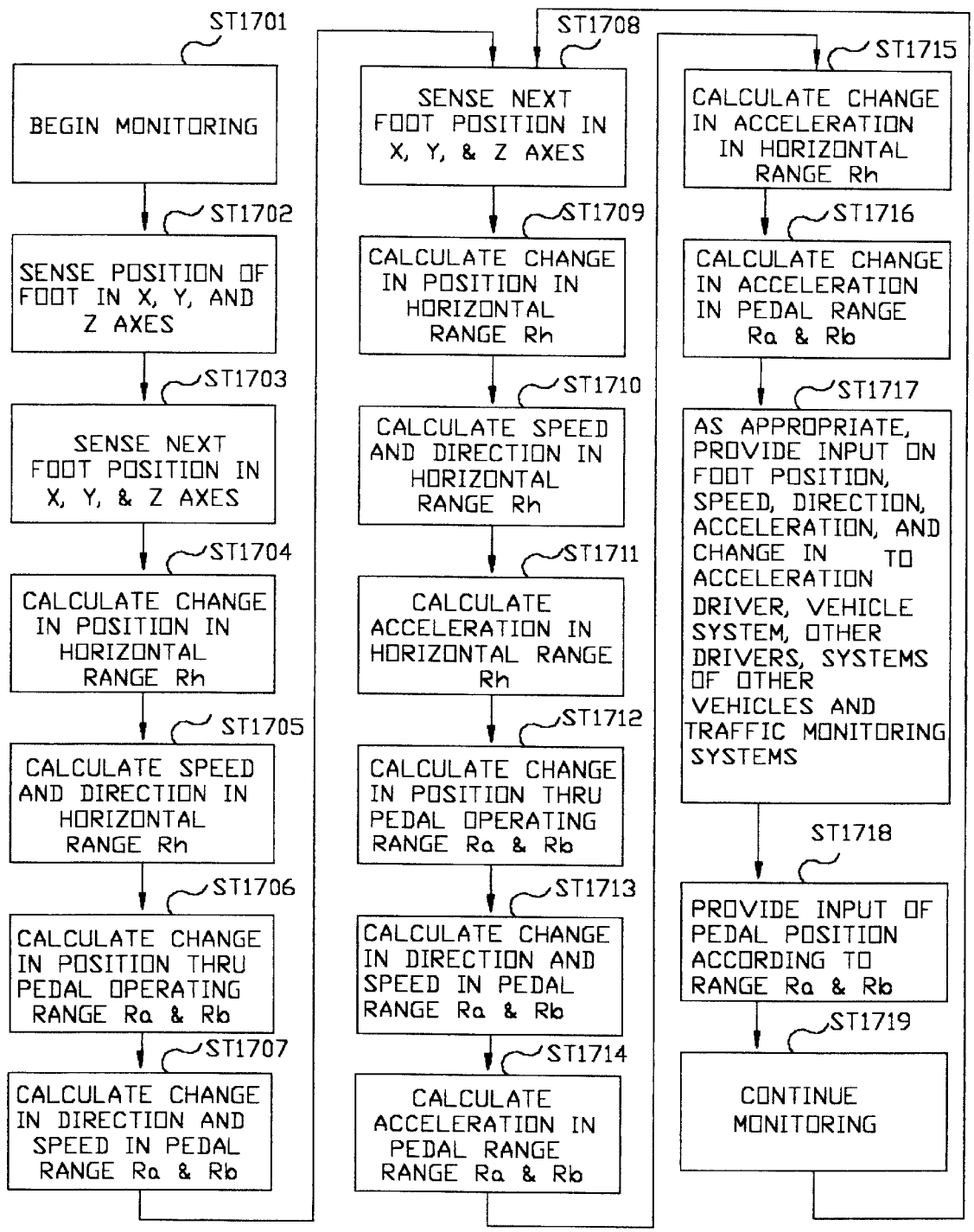
FIG. 11 is a flowchart that shows a sequence of sensing and calculating that the information system performs.

FIG. 11 shows how foot motion is processed by the information system in steps ST1701 through ST1719. The cycle starts with two foot positions being sampled ST1702 and ST1703. A change in the position of the foot in the horizontal range Rh across the pedals is then calculated ST1704 by comparing the two initial sensed positions. The direction and speed of foot movement in Rh ST1705 is calculated from the different positions and the division by time to provide the speed. A change in the position of the foot in the accelerator pedal range Ra and brake pedal range Rb ST1706 is then calculated by comparing the two initial sensed positions. The direction of the foot in the brake pedal range Ra and accelerator pedal range is then determined ST1707 as well as the speed of the foot as determined by the change in position when compared to elapsed time. The foot is monitored for position a next time ST1708. Changes in position, direction, and speed are calculated as with the previous steps. With a third position, calculation is now made for acceleration in the horizontal range Rh ST1711 and in the accelerator pedal range Ra and the brake pedal range Rb ST1714. With the second acceleration values, calculation can now be made to calculate changes in acceleration for the horizontal range RhST1715 and the accelerator pedal range Ra and brake pedal range Rb ST1716. The derived information is now available for incorporation into systems that can use the information ST1717, including the driver, the vehicle system, other drivers, systems of other vehicles, and traffic monitoring systems. Updated information is provided by returning to the next step of sensing the foot position ST1708.

Figure 12:
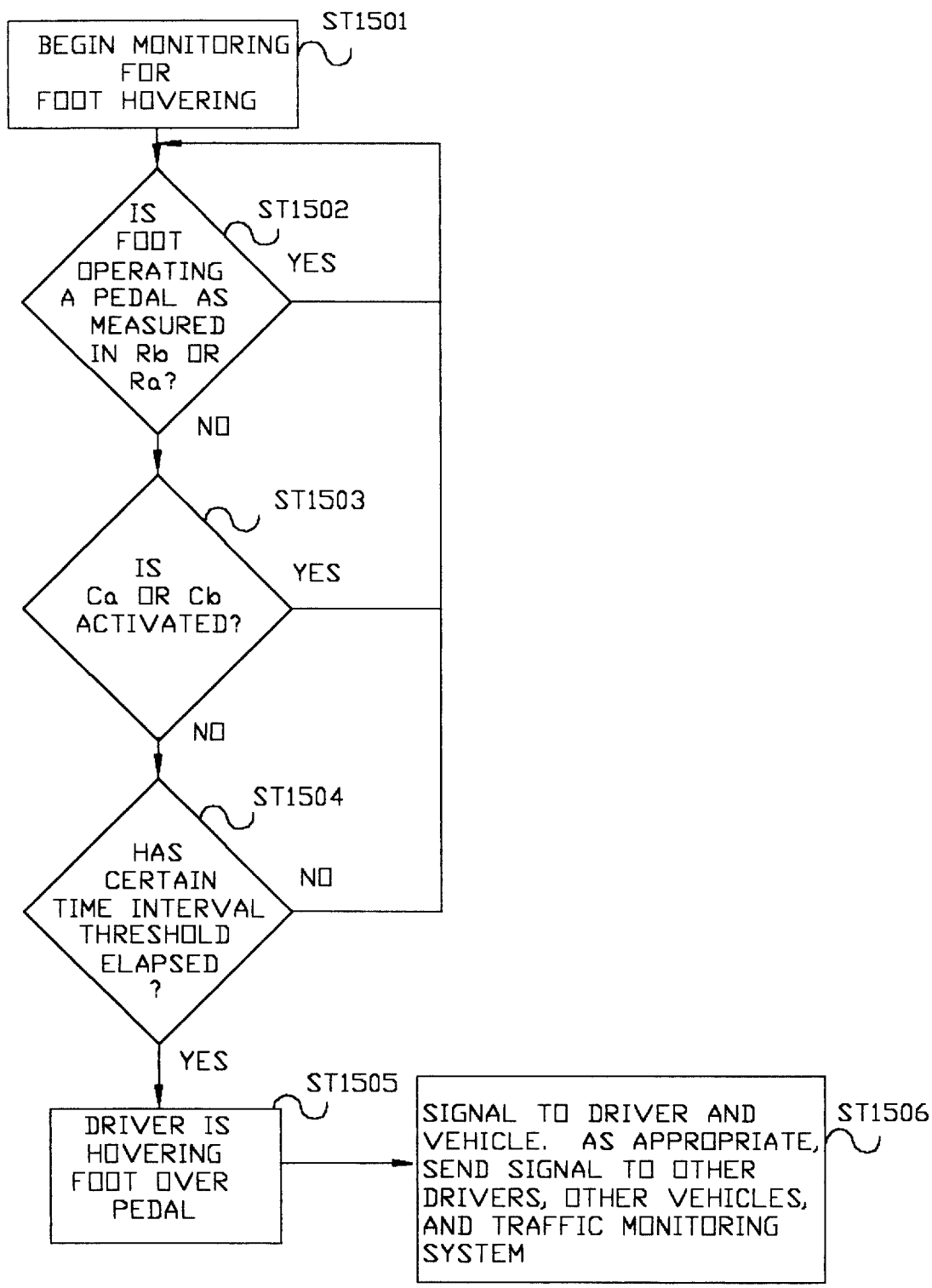
FIG. 12 is a flowchart that shows how the information system can monitor the hovering of a foot over a pedal.

FIG. 12 shows how the information system can monitor the hovering of the foot by a driver in steps ST1501 through ST1506. Factors looked at include whether the foot is engaged with a pedal or not ST1502, if input is provided from another source that says whether or not either of the pedals is engaged ST1503, and if a certain time interval has elapsed ST1504. If it is determined that the driver is hovering a foot over one of the pedals ST1505, then the driver can be notified and, as appropriate, the information could be shared with others.

Figure 13:
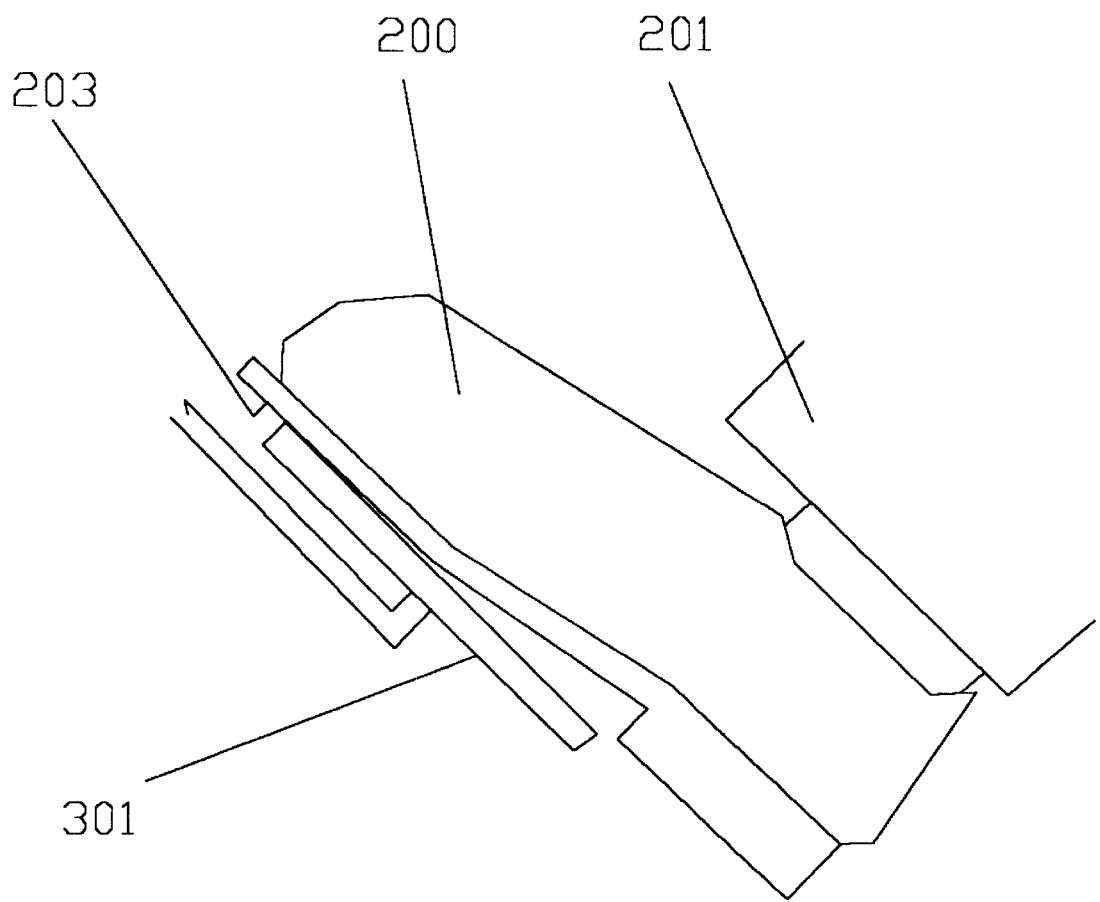
FIG. 13 shows the close relationship between the operating foot and a pedal that is being activated.

FIG. 13 shows the basis on how the information system can use the position of the foot 200, particularly the foot bottom 203, as a basis for determining the position of a pedal, in FIG. 13 shown as a brake pedal 301, without having to have input from outside the information system. The foot bottom 203 makes contact with the brake pedal 203 in order to make actuation of the brake pedal.

Figure 14:
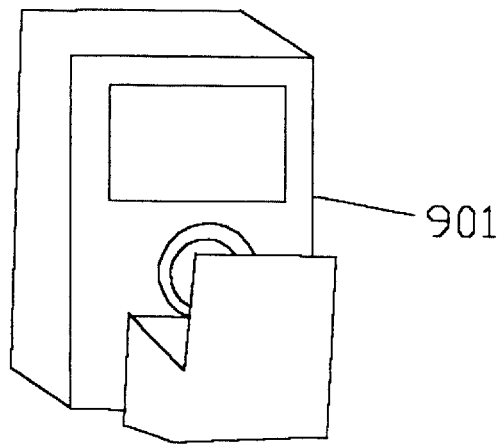
FIG. 14 shows potential users of the system who are not in the driven car.
Figure 14:
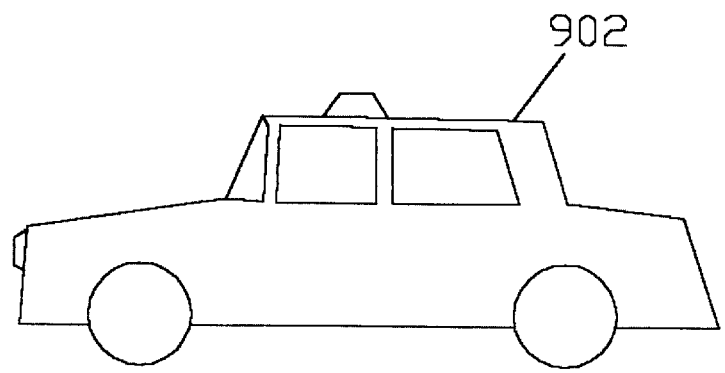

FIG. 14 shows two users of the information system that do not have to be navigating on an actual road to benefit from the system. Driving simulators 901 will allow users to learn more about the driving environment and especially how they need to be alert. The simulator 901 can be used to put students in situations where they will learn to read cues provided by other drivers as well as use the information provided by the information system. Management authorities 902, whether they represent police or other traffic entities, can use the system to pay attention to the information provided by the users on the road. Information can be used to direct agencies to direct a further investigation into a particular site, whether it is for general road conditions or to investigate a large amount of activation which can indicate that a traffic mishap has occurred.

Figure 15:
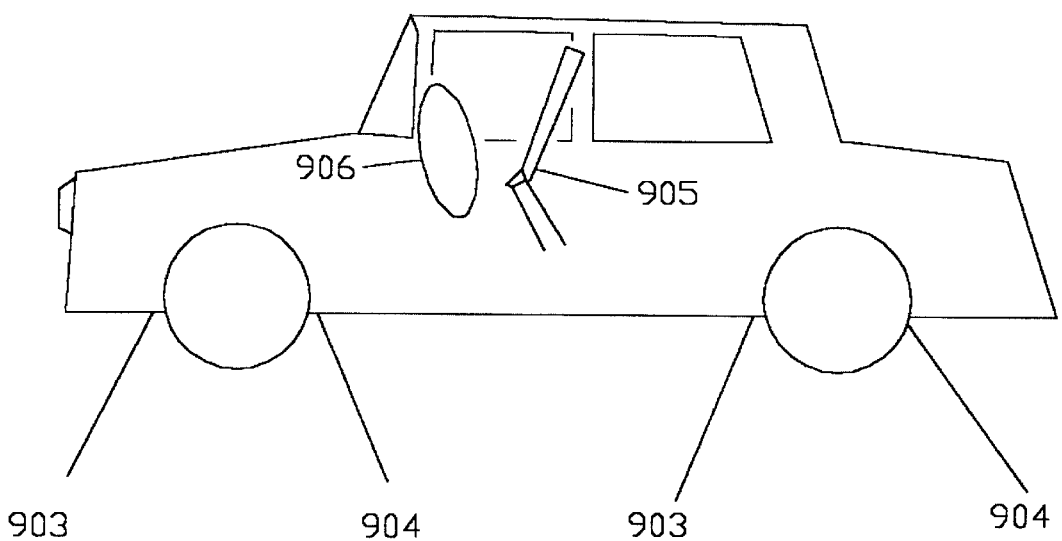
FIG. 15 shows safety systems that can interface with the information system.

FIG. 15 is used to depict the use of the information system with safety systems that are meant to protect the lives of occupants. Output from the information system, especially when generated with quick foot movement, would allow an airbag system 906 to prepare itself for activation in case the driver provided actions that were representative of emergency maneuvering. The same would work with seatbelts 905 so that the seatbelts 906 would retract and form a snugger fit around the occupant. This would keep the occupants in a safer position in case of an accident. FIG. 15 also shows where components of a brake system 903 can be found. A monitored emergency response of the driver could signal the brake system to prepare itself for action by minimizing any unnecessary clearance between friction members. The information system could also work to provide input to other systems which can use the information in deciding the deployment of automatic braking using the brake system 903. The information could also be used to provide input to vehicle powertrain components 904, also viewed as generally being under the body, so that distribution of power to the road by the vehicle could be adjusted to respond to driving characteristics of the driver.

A number of uses of the present invention have been described. It will be understood that various modifications may be made without departing from the spirit and scope of the invention. There is no special art required by any person in the field to understand how the various position, speed, and acceleration values can be sensed or derived. Nor is there difficulty for a person trained in the art to understand that drivers who see the need to react quickly will move their legs and feet faster than if the need was not as imperative. Accordingly the scope of the invention is only to be limited as necessitated by the accompanying claims.

I claim:

1. An information system for evaluating the activity of a driver of a motor vehicle by monitoring position and motion of an operator's feet, including a sensor with non-contact detecting means that emits energy and receives energy that is reflected to detect the position and motion of the feet and a processor to calculate the position and motion of the feet by tracking the positions of the feet through elapsed time.

2. A system according to claim 1 which monitors the position of an operator's foot through the range of operation of a control pedal.

3. The system according to claim 1 which has a means for determining speed so that a speed of an operator's foot can be monitored.

4. The system according to claim 3 which includes means for determining the speed of an operator's foot to a pedal.

5. The system according to claim 3 which has a means for determining a change of a rate of speed so that a change in a rate of speed of an operator's foot can be determined.

6. The system according to claim 5 where the system includes means for monitoring the change of the rate of speed of the operator's foot between pedals.

7. The system according to claim 5 where the system includes means for monitoring the change of the rate of speed of the operator's foot through an operating range of a pedal.

8. The system according to claim 5 which has a means for determining a change in the change of the rate of speed so that a change in the change of the rate of speed of an operator's foot can be determined.

9. The system according to claim 3 which has a means for determining the speed of a pedal by using a speed of an operator's foot in contact with a pedal so as to determine how fast a pedal is being operated.

10. The system according to claim 1 which has a means for sensing direction so that the direction of movement of an operator's foot can be determined.

11. The system according to claim 10 which includes means for determining the direction of movement of an operator's foot based on change in position over time in order to determine which pedal the operator's foot is heading to.

12. The system according to claim 11 which has a means for determining if an operator's foot is going in a nonpreferred foot direction so that it can determine if the operator's foot may be going in a nonpreferred direction.

13. An information system according to claim 2 which has a means to determine potential changes in maneuvers by a driver so that a potential change in maneuvering by a driver can be determined, including accelerating, braking, and steering.

14. A system according to claim 1 which monitors the legs.

15. A system according to claim 1 which monitors any article which can be used to control the operating pedals.

16. A system according to claim 1 which also has a recorder for the accumulation of data for later use.

17. A system according to claim 1 with a communication means for providing information about the activity of a driver so that monitoring organizations can be informed, including traffic authorities and police.

18. A system according to claim 1 which is intended to be used with a simulator.

19. A system according to claim 1 which has a means for monitoring anxiety of a driver by comparing operator foot activity with thresholds that may be indicative of anxiety so that anxiety of a driver can be monitored.

20. A system according to claim 1 which has a means for monitoring the alertness of a driver by comparing operator foot activity with thresholds that may be indicative of alertness so that the alertness of a driver can be monitored.

21. A system according to claim 1 with a means to provide input to systems of other vehicles.

22. The system according to claim 2 which has a means to provide input in volume control of an audio system so that it can provide input in the control of volume level of an audio system.

23. The system according to claim 1 which has a means to provide input in throttle control of a vehicle so that it can provide input in the operation of throttle control.

24. The system according to claim 1 which has a means to provide input in operation of brake components so that it can provide input in the operation of braking components.

25. The system according to claim 2 which has a means to provide input in powertrain operation so that it can provide input in the operation of vehicle powertrain components.

26. The system according to claim 1 which has a means to provide input in survival system operation so that it can provide input in the operation of systems associated with passenger survival, including seatbelts and airbags.

27. A system according to claim 1 which uses light signals to convey information to other drivers.

28. An information system that monitors the feet of an operator to provide input into operational systems of a vehicle, including a sensor with non-contact detecting means that emits energy and receives energy that is reflected to detect the position and motion of the feet and a processor to calculate the position and motion of the feet by tracking the positions of the feet through elapsed time.

29. An information system that monitors the feet of a driver to detect actual and potential action of a driver, including a sensor with non-contact detecting means that emits energy and receives energy that is reflected to detect the position and motion of the feet and a processor to calculate the position and motion of the feet by tracking the positions of the feet through elapsed time.

* * * * *